United States Patent
Orton-Jay

(10) Patent No.: US 12,335,499 B2
(45) Date of Patent: Jun. 17, 2025

(54) METHOD FOR DECODING A VIDEO STREAM

(71) Applicant: V-NOVA INTERNATIONAL LIMITED, London (GB)

(72) Inventor: Sam Orton-Jay, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 144 days.

(21) Appl. No.: 17/933,754

(22) Filed: Sep. 20, 2022

(65) Prior Publication Data

US 2024/0098285 A1    Mar. 21, 2024

(51) Int. Cl.
| | |
|---|---|
| *H04N 19/31* | (2014.01) |
| *H04N 19/136* | (2014.01) |
| *H04N 19/142* | (2014.01) |
| *H04N 19/172* | (2014.01) |
| *H04N 19/184* | (2014.01) |
| *H04N 19/42* | (2014.01) |
| *H04N 19/463* | (2014.01) |

(52) U.S. Cl.
CPC ........... *H04N 19/31* (2014.11); *H04N 19/136* (2014.11); *H04N 19/142* (2014.11); *H04N 19/172* (2014.11); *H04N 19/184* (2014.11); *H04N 19/42* (2014.11); *H04N 19/463* (2014.11)

(58) Field of Classification Search
CPC .... H04N 19/31; H04N 19/136; H04N 19/142; H04N 19/172; H04N 19/184; H04N 19/42; H04N 19/463
See application file for complete search history.

(56) References Cited

U.S. PATENT DOCUMENTS

| | | | |
|---|---|---|---|
| 2014/0219338 A1* | 8/2014 | Komiya | H04N 19/187 375/240.02 |
| 2017/0237999 A1* | 8/2017 | Hendry | H04N 19/39 375/240.26 |
| 2017/0250881 A1* | 8/2017 | Kellicker | H04L 65/1083 |
| 2019/0182518 A1* | 6/2019 | Mittal | H04N 21/2347 |

\* cited by examiner

*Primary Examiner* — Mohammed S Rahaman
(74) *Attorney, Agent, or Firm* — Workman Nydegger

(57) ABSTRACT

A method for decoding a video stream is described. The method comprises: receiving a video stream at a server application, the video stream being encoded according to a multi-layer coding scheme; passing, to a base decoder, an encoded base stream comprised by the video stream, for obtaining a decoded base stream; and passing, to an enhancement decoder, an encoded enhancement stream comprised by the video stream for decoding, wherein an original input video may be reconstructed from the decoded base stream and the decoded enhancement stream.

20 Claims, 13 Drawing Sheets

METHOD FOR DECODING A VIDEO STREAM

FIELD OF THE INVENTION

The present invention relates to methods, systems, computer programs and computer-readable media for use in decoding video streams.

BACKGROUND

Encoding and decoding of video content is a consideration in many known systems. Video content may be encoded for transmission, for example over a data communications network. When such video content is decoded, it may be desired to increase a level of quality of the video and/or recover as much of the information contained in the original video as possible. Many video coding formats, and their associated codecs, have been developed that attempt to achieve these desired characteristics, but often require significant software updates at the level of an operating system and/or hardware upgrades. Furthermore, to increase the quality of decoded video content, it is typically required to increase the complexity of the encoding and decoding procedures, which can increase power usage and increase the latency with which video content can be delivered.

A hybrid backward-compatible coding technology has been previously proposed, for example in WO 2014/170819 A1 and WO 2018/046940 A1, the contents of which are incorporated herein by reference. Further examples of tier-based coding formats include ISO/IEC MPEG-5 Part 2 LCEVC (hereafter "LCEVC"). LCEVC has been described in WO 2020/188273A1, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020, both documents being incorporated by reference herein in their entirety.

In these coding formats a signal is decomposed in multiple "echelons" (also known as "hierarchical tiers") of data, each corresponding to a "Level of Quality", from the highest echelon at the sampling rate of the original signal to the lowest echelon. The lowest echelon is typically a low quality rendition of the original signal and other echelons contain information on correction to apply to a reconstructed rendition in order to produce the final output.

LCEVC adopts this multi-layer approach where any base codec (for example Advanced Video Coding—AVC, also known as H.264, or High Efficiency Video Coding—HEVC, also known as H.265) can be enhanced via an additional low bitrate stream. LCEVC is defined by two component streams, a base stream typically decodable by a hardware decoder and an enhancement stream consisting of one or more enhancement layers suitable for software processing implementation with sustainable power consumption. The enhancement provides improved compression efficiency to existing codecs, and reduces encoding and decoding complexity.

Since LCEVC and similar coding formats leverage existing decoders and are inherently backwards-compatible, there exists a need for efficient and effective integration with existing video coding implementations without complete re design. Examples of known video coding implementations include the software tool FFmpeg, which is used by the simple media player FFplay.

LCEVC is not limited to known codecs and is theoretically capable of leveraging yet-to-be-developed codecs. As such any LCEVC implementation should be capable of integration with any hitherto known or yet-to-be-developed codec, implemented in hardware or software, without introducing coding complexity.

Red5 Pro, 18 Aug. 2020, "9 Reasons why LCEVC circumvents the Codec wars", Red5 Pro (https://www.red5pro.com/blog/9-reasons-why-lcevc-circumvents-the-codec-wars) discloses live streaming involving the Low Complexity Enhancement Video Coding (LCEVC) codec. Jan Ozer, Mar. 12, 2020, "How to Encode with LCEVC', Streaming Media, (https://www.streamingmedia.com/Articles/ReadArticle.aspx?Articlel D=139705) discloses encoding LCEVC. ITU Journal: ICT Discoveries, Vol. 3(1), 8 Jun. 2020; Florian Maurer et al; "Overview of MPEG-5 Part 2—Low Complexity Enhancement Video Coding (LCEVC)" (https://www.itu.int/pub/S-JOURNAL-ICTS.V311-2020-12) discloses an outline of the LCEVC encoder and decoder coding structure, tools, and an overview of the performance of LCEVC.

It may be desirable to integrate LCEVC implementations with existing frameworks for handling and decoding video streams, for example those used widely in operating systems such as iOS®. A need exists for an approach to utilising multi-layer coding structures such as LCEVC together with operating systems and native base decoders thereof, in order to achieve the aforementioned gains in efficiency without requiring additional hardward and also minimising required changes to software.

SUMMARY OF INVENTION

Aspects and variations of the present invention are set out in the appended claims. Certain unclaimed aspects are further set out in the detailed description below.

According to one aspect, there is provided a method comprising:
  receiving a video stream at a server application, the video stream being encoded according to a multi-layer coding scheme;
  passing, to a base decoder, an encoded base stream comprised by the video stream, for obtaining a decoded base stream; and
  passing, to an enhancement decoder, an encoded enhancement stream comprised by the video stream for decoding, wherein an original input video may be reconstructed from the decoded base stream and the decoded enhancement stream.

The inventors have realised that a server application can be advantageously used in handling encoded video streams, particularly those encoded according to multi-layer schemes. Employing such a server application so as to receive an incoming video stream at that application in place of a native player or decoder forming part of an existing framework within a conventional operating system, for instance, and passing an encoded base component of that stream to that decoder, while handling an enhancement stream separately, enables high efficient video decoding approaches to be integrated with devices and operating systems thereof, through straightforward integration processes.

The said video stream may be thought of as input data. The said server application typically runs on the same terminal device as the base decoder and/or a decoder integration layer (DIL). The video stream being encoded according to a multi-layer coding scheme may be thought of as the stream comprising an encoded base stream and an encoded enhancement stream.

The method may involve passing the encoded base stream to the base decoder either directly or indirectly. The encoded base stream may be thought of as second input data comprised by the video stream or aforementioned input data. The said passing of the encoded base stream to the base decoder preferably involves instructing, by a server application or otherwise, a base decoder to obtain, from an encoded base stream comprised by the video stream, a decoded base stream. The encoded base stream that is passed or transmitted to the base decoder is typically suitable for, or adapted for, obtaining the decoded base stream therefrom.

The passing of the encoded enhancement stream to the enhancement decoder likewise may be performed directly or indirectly. Typically the method comprises obtaining the decoded enhancement stream from the video stream, and/or obtaining the encoded base stream from the video stream. Preferably, these streams are obtained by the server application.

The passing of the encoded enhancement stream to the enhancement decoder preferably involves instructing a decoder integration layer (DIL) to decode an encoded enhancement stream comprised by the video stream. Preferably it further comprises instructing the DIL to reconstruct an original input video. Although instructions to either or both of the base decoder and DIL may be sent by a suitably configured device or application instance running thereon, in some embodiments the instructions or a subset of those instructions may be sent directly or indirectly from the server application.

It will be understood that the decoded base stream is typically that decoded by the base decoder, and that the decoded enhancement stream is that decoded by the DIL in preferred embodiments.

The method may be advantageously applied to devices using iOS operating systems. Integration of the capability to handle multi-layer encoded streams on such devices is a key objective of some embodiments. Therefore, in some embodiments, the base decoder is a native decoder of an iOS operating system. Preferably the encoded enhancement stream is passed to the DIL as alluded to above. In some embodiments, a decoder integration layer accordingly controls operation of the enhancement decoder.

Typically, the method further comprises receiving, by the server application, a request for a data asset sent by the base decoder. This receipt may be thought of as intercepting the said request. Typically, however, the receipt of the request by the server application occurs as a result of the request from the base decoder having been modified so as to be sent to the application server rather than to the data asset source from which it is to be received, directly. This modification is typically performed by an application or module comprising the base decoder. In such embodiments, the method typically further comprises sending the intercepted request to such a data asset source, and receiving, by the server application and in response to the request, a data asset comprising the video stream. The data asset may be referred to as a video asset. The data asset may likewise be referred to as video data or a video stream. The request for the data asset is typically sent in accordance with, or responsive to, an instruction by a client application. The request may, in some embodiments, be sent by a module comprising or in communication with the base decoder. Typically, this module or application is comprised by the Apple AVFoundation framework, and typically comprises an AVPlayer instance. The methods disclosed herein are suited for use with AVPlayer, and facilitate the efficient handling of enhanced video by devices utilising AVPlayer and particular modified versions thereof.

The said data asset source is typically an external server, and may be referred to as an origin server. Typically, a data asset source such as a video-on-demand server returns a response to the entity or network address from which the request for the asset or data comprised in the response was received. However, in some embodiments, the method further comprises, prior to the sending of the request by the server application, modifying the request so as to indicate the server application as a recipient of the response to the request. Generally, the server application works on a device, such as an iOS device, on which an instance of the base decoder, which may comprise an AVPlayer instance, is running. That is to say, typically the server application is not executed on a device that is remote to the decoders. Preferably, the server application and base decoder, and preferably also the decoder integration layer, are executed on the same device, which is preferably an iOS device.

In preferred embodiments, the base decoder is part of a framework or application that supports adaptive bitrate (ABR) video streaming. For example, it will be understood that streaming protocols such as the Apple HTTP Live Streaming (HLS) media streaming communications protocol are implemented as part of various operating systems. Conventionally, ABR protocols such as HLS are supported by video handling configurations such as those implemented in the AVFoundation framework for video streams such as video-on-demand and live content. For instance, existing AVPlayer implementations are adapted to receive streams of video assets that are divided into pluralities of video chunks, typically MPEG2-TS files of differing bitrates and predetermined durations. Typically, index files are provided which may serve as playlist files for those received video segments. Generally, each playlist corresponds to a respective bitrate level, and contains location information or URLs for the video segments with relevant bitrate information. Client devices and applications utilising AVPlayer are typically configured to request the appropriate playlist depending upon the available bandwidth. In preferred embodiments of the method, the appropriate bitrate level, which may be thought of as corresponding to a bitrate profile, is selected from available profiles in a manner that ensures that both the base stream and enhancement stream are decoded using the appropriate profile, for example when bandwidth changes or other factors cause ABR changes. In this way, the enhanced decoder, which may be an enhanced iOS or AVPlayer-compatible decoder, is able to select and decode appropriate video segments concurrently with bitrate profile changes that are made by the native AVPlayer decoder or other base decoder. Therefore, in preferred embodiments, the method further comprises instructing the base decoder to obtain the decoded base stream in accordance with a predetermined bitrate parameter set according to the encoded base stream. As noted above, typically multiple buffer queues are created when video data is received, with these queues corresponding to different video bitrates. These are available for decoding, and the decoding is typically performed on the appropriate one by way of selecting the appropriate bitrate profile. This may be understood as the profile corresponding to the current bitrate, or, if there is a bitrate change, the next active queue following that change.

It will be understood that the method may additionally or alternatively comprise instructing the enhancement decoder to decode the enhancement stream in accordance with the predetermined bitrate profile. The bitrate parameter set may comprise one or more parameters. This parameter set may be thought of as the bitrate profile, or an indication thereof. It may be thought of as being representative of the bitrate of the encoded video stream. The bitrate parameter set may correspond in particular to a current frame and/or one or more subsequent frames of the encoded base stream.

In accordance with such methods, the method may further comprise detecting a change to the predetermined bitrate parameter set corresponding to a change in video bitrate. It will be understood that an ABR profile may be altered during receipt or playback of a video stream. The identifying of a parameter set, or the need to change to a different parameter set, may comprise identifying directly a buffer queue corresponding to a particular ABR profile, and/or it may comprise identifying the profile parameter set from which the appropriate bitrate video segment can be selected or inferred. The said change is typically a forthcoming change. This may a change that is to occur for, or coinciding with, any current or subsequent frame.

The detecting the change preferably comprises detecting a bitrate parameter set change notification. As is described in more detail later in this disclosure, typically such a notification is generated by a native decoder of an iOS operating system, in particular an AVPlayer instance. In some embodiments, the notification comprises notification data recorded in a log, and the detection of the notification comprises monitoring or analysing data recorded in the log. The log is typically held in a log file, or in a storage unit or resource in which logged data is recorded. Typically the log is an instance of an object that accumulates key metrics about network playback and typically also presents them as a collection of event object instances. For example, where the method involves an AVPlayer, the log may be an AVPlayerItemAccessLog instance. Generally, the log is accessed via an application program interface (API). The said monitoring and analysing may be performed additionally or alternatively to one another.

The detecting of a change, for example using a notification as described above, typically does not in itself provide an indication of a specific time for the change occurring. Preferably, the detection may comprise detecting when the rate has changed. Therefore, the method may further comprise obtaining an indication of a time at which the change in bitrate occurs, or has occurred, or in other words may comprise identifying that time. This may be an indication by way of directly indicating an absolute time, or a relative time with respect to some time marker related to the video decoding, receipt or playback. It may be, for example, a time stamp or frame number or ID.

The obtaining the indication, in some embodiments, comprises detecting a change in an identifier associated with the video stream. This identifier may typically be a track ID for input data, or for a video asset. In iOS implementations, it may be an AVAsset. The identifier change typically indicates a profile change, and typically the time (for example absolute or relative to an event such as a notification) can be obtained or inferred from a change to the track ID, therefore. Typically, the track ID changes for action and operation types such as picture searches and seek actions, in addition to changing for ABR profile changes. Therefore, preferably this is performed in combination with the obtaining the indication or detecting the change in combination with the notification criteria and, optionally, additionally or alternatively, a frame resolution as described below.

The said association with the video stream may comprise the identifier being that of a current video asset, that is the data asset being decoded and/or played at a current time for example.

Preferably, the obtaining the indication comprises identifying a difference in frame resolution between a first frame in the video stream and a second, immediately subsequent frame in the video stream, and obtaining the indication based on a time at which the second frame occurs. In the context of digital images comprised by frames of video, the resolution may be understood as being, or at least indicating or representing, a pixel count for a frame. That is to say, it may correspond to a number of pixels contributing to or contained in an image. Additionally or alternatively, it may comprise a count and/or ratio of numbers of rows and columns of pixels in video frames, for example an aspect ratio or indication of resolution by a number of rows such as 1080 p or 2160 p. The indication may also be obtained in a manner comprising determining a time of the first frame. This enables the change to be readily identified. However, bitrate changes do not necessarily entail resolution changes, and therefore preferably the aforementioned identifier, or track ID change, is used additionally where appropriate for. The use of this additional criterion allows the overall process of identifying a bitrate change to be carried out more efficiently. A frame occurring may be understood as a frame appearing the stream and/or the frame being decoded and/or displayed.

Preferably, the method further comprises identifying the changed bitrate parameter set. That is to say, in preferred embodiments the bitrate profile to which the change is being made is identified. In some embodiments, a change in bitrate may be identified based on a resolution change in the absence of a monitored or detected notification. It is possible for the issue or monitoring of the bitrate change notification to be delayed. Thus, advantageously, if a resolution change is detected between frames or identify changes, then it may be accepted as signifying an ABR change in itself, in some implementations.

The changed bitrate parameter set may be one of a plurality of bitrate parameter sets. For example, this plurality may be listed or recorded in a manifest. This typically indicates the available bitrate profiles in accordance with which a video stream is to be decoded, and may, in some embodiments, be indicated in the playlists previously described. The bitrate parameter set of a video stream prior to the change is typically also comprised in the plurality of sets. The identifying the changed bit parameter set may accordingly be performed in accordance with a determination of whether any one of the plurality of bitrate parameter sets corresponds to a frame resolution that is the same as a frame resolution corresponding to another of the plurality of bitrate parameter sets. This determination may, in some implementations, be a predetermination, or in other embodiments the determination may be made as part of the method. In other words, the method may involve ascertaining whether all available profiles correspond to the different video resolutions, or whether any of those profiles are the same in terms of frame resolution. If all of the profiles correspond to different resolutions, then the identifying of a changed profile may be performed with greater efficiency, and therefore this determination improves the overall efficiency of the method. Typically, if the determination is negative, the identifying the changed bitrate parameter set comprises comparing the frame resolution of a video stream frame occurring after the change to the frame resolution corresponding to each of one or more of the plurality of bitrate parameter sets and determining the changed parameter set to be the one of the said plurality that corresponds to the frame resolution of the said video stream frame. Thus, if all of the plurality of bitrate parameter sets correspond to different frame resolutions, then it may utilise the simplicity of this case wherein a base frame has a different resolution from a preceding frame that is received, and the resolution of the frame may in itself be used to identify the new bitrate profile. That is to say this matching may be used to implement a simple and efficient selection of the next active buffer queue video stream, since no resolution degeneracy can be ensured for the available queues.

In some embodiments, the first plurality of bitrate parameter sets may comprise a second plurality of bitrate parameter sets. The second plurality may be the same as the first. However, preferably it comprises fewer sets than the first. A selection may be made in a number of ways, as now described. Typically, if the aforementioned determination is positive, the changed bitrate parameter set may be identified by selecting, from the second plurality, a bitrate parameter set corresponding to a maximum bitrate or bitrates corresponding to parameter sets of the second plurality. It is advantageous to perform the steps now described on the condition that there is degeneracy in the available profile resolutions. However, the method steps may also be carried out in absence of such a condition, that is, in some embodiments these may be performed regardless of whether there is such degeneracy, including when all profiles correspond to different resolutions. The determination being positive may be understood as any two of the set plurality of bitrate parameter sets corresponding to the same frame resolution. The changed bitrate parameter set may accordingly be identified as one of the said second plurality that corresponds to the highest video bitrate. In preferred embodiments, if there are multiple notifications that correspond to the same resolution, with the current image, then the method may further comprise checking, or otherwise inspecting or analysing, one or a plurality of the last downloaded video segments, and typically also identifying the sub-playlist that comprises or responds to that segment. In the event that there are multiple options for finding the next stream, typically signifying that segments from multiple sub-playlists have been downloaded, then the highest bitrate one may be selected, as described above.

The ABR profile selection process may be made more computationally efficient still by preselecting candidate ABR profiles prior to this selection. This may firstly be based on time ranges for the video segments. In some embodiments, it is possible to forego the bitrate matching in some cases if the time range-based selection, typically in combination with the resolution-based selection, allows a single matching profile parameter set to be identified. Preferably, the first plurality of bitrate parameter sets comprises a third plurality of bitrate parameter sets, and the second plurality of bitrate parameter sets is obtained by selecting from the third plurality of bitrate parameter sets, or preferably any, bitrate parameter sets that corresponds to a time period containing an indicated time, preferably that indicated as described above, at which the change in bitrate occurs. The third plurality may be the same as the first plurality, or may be a selective subset thereof. Thus filtering based on a time period is preferably performed by reference to a data set indicating a time period to which each ABR profile corresponds.

The selection process may be made more efficient still by first making a selection from the available ABR profiles based on the video resolution. Resolution in this context may be understood to have the meaning set out earlier in this disclosure, that is preferably a pixel or row/column count. If only one profile matches the video resolution, the parameter set can be selected on that basis alone. Therefore, preferably, the third plurality of bitrate parameters may be obtained by selecting, from the first plurality of bitrate parameter sets, those bitrate parameter sets that correspond to the same frame resolution as that of a video stream frame occurring after the change to the predetermined bitrate parameter set, preferably immediately thereafter. Any one of first, second and third bitrate parameter sets may be the same as and/or different from any of the others of the first, second and third bitrate parameter set pluralities. The selection based on matching frame resolutions may typically be performed prior to selections based on time ranges or bitrates. Accordingly, it is possible, where a single matching profile parameter set is identifiable based on the resolution, to forego the subsequent selection steps and use only that resolution. In other cases, efficiency improvements may nevertheless be achieved by way of performing pre-selections, or a series thereof, in order to identify the appropriate profile.

The method typically further comprises instructing a rendering module to render a video frame using the reconstructed first rendition at the relatively high quality level. As with the previously described instructing steps, in some embodiments these may be performed by or via the server application.

Typically the video stream comprises first input data based on a set of spatio-temporal correlation elements and second input data based on a rendition of a first time sample of a signal at a relatively low level of quality in a tiered hierarchy having multiple levels of quality, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal. Typically the said instructing the decoder integration layer comprises instructing the decoder integration layer perform the said reconstructing by way of obtaining a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality.

Typically the instructing the base decoder to obtain the decoded base stream comprises instructing the base decoder to obtain the second rendition, typically at the relatively low level of quality. Typically the instructing the decoder integration layer to reconstruct an original input video comprises instructing the decoder integration layer to reconstruct the first rendition at the relatively high level of quality using the second rendition and the set of residual elements.

The first data is typically at the relatively high level of quality. The second data is typically at the relatively high level of quality. The second time sample of the signal is typically an earlier time sample relative to the first time sample of the signal. Typically the first reference data comprises a first set of spatial correlation elements associated with the first time sample of the signal, the first set of spatial correlation elements being indicative of the extent of spatial correlation between the plurality of residual elements in the set of residual elements.

Typically the second reference data comprises a second set of spatial correlation elements associated with the second time sample of the signal, the second set of spatial correlation elements being indicative of an extent of spatial correlation between a plurality of residual elements in a further set of residual elements associated with the second time sample, and wherein the further set of residual elements is usable to reconstruct the rendition of the second time sample of the signal at the relatively high level of quality using data based on a rendition of the second time sample of the signal at the relatively low level of quality.

Typically the first reference data comprises the first rendition of the first time sample of the signal. Typically the second reference data comprises a reconstructed rendition of the second time sample of the signal at the relatively high level of quality. Typically the input data includes data indicative of a result of a selection between the set of spatio-temporal correlation elements and the first set of spatial correlation elements for inclusion in the input data.

Typically the data indicative of the result of the selection is included in a bit sequence associated with a given data element in the input data, the given data element being indicative of an extent of horizontal correlation between a plurality of residual elements in the set of residual elements.

Typically the first input data comprises a selected quantised one of the set of spatio-temporal correlation elements and the first set of spatial correlation elements for inclusion in the input data. Typically the method comprises: retrieving first buffer data from a buffer; and reconstructing the first rendition using the first buffer data. Typically the first buffer data comprises the second reference data. Typically the method comprises: generating second buffer data using the set of spatio-temporal correlation elements; and updating the buffer by overwriting the first buffer data with the second buffer data.

Typically the method comprises generating the second buffer data by combining the set of spatio-temporal correlation elements with the first buffer data. Typically the first buffer data comprises at least one zero value. Typically the second rendition is derived by performing an upsampling operation on the rendition at the relatively low level of quality. Typically the signal is a video signal. Typically the input data is received from at least one other apparatus via one or more data communication networks.

Preferably the enhancement decoder is an LCEVC decoder such that the decoder integration layer, one or more plug-ins and the enhancement decoder together provide an LCEVC decoding software solution. The LECVC decoding software stack may be implemented in one or more LCEVC decoder libraries and thus provides an optimised software library for decoding MPEG-5 enhanced streams.

The decoder integration layer may also include control operation of an upscale operation to upscale the decoded video signal from the base encoding layer so that the one or more layers of residual data may be applied to the decoded video signal from the base encoding layer. The decoder can be easily implemented on popular media players across platforms such as iOS.

The one or more decoder plug-ins may be configured to instruct the corresponding base decoder through a library function call or operating system function call. Hence, different base decoding implementations may be easily supported, including native implementations within an operating system and hardware-accelerated decoding.

The decoder integration layer may be configured to apply the one or more layers of residual data from the enhancement encoding layer to the decoded video signal from the base encoding layer to generate the decoded reconstruction of the original input video signal. In certain cases, the decoder integration layer may instruct a plug-in from the set of decoder plug-ins to apply the one or more layers of residual data; in other cases, the decoder integration layer may obtain a decoded output from the base encoding layer that was instructed using the decoder plugin and combine this with the output of the enhancement decoder. Preferably the layers of residual data may be applied during playback.

In certain embodiments the decoder integration layer is configured to receive: one or more input buffers comprising the encoded video signal and the encoded enhancement signal in an encoding order, wherein the one or more input buffers are also fed to the base decoders; and, one or more base decoded frames of the decoded video signal from the base encoding layer, in presentation order. In this way minimal processing is needed by a client and the integration takes care of the operation for the client. The same input buffers can be passed to the base decoding layer and the enhancement decoding layer to aid simplicity.

In particularly preferred embodiments, the control interface comprises an output type configuration parameter, wherein the decoder integration layer is configured to vary how the decoded reconstruction of the original input video signal is output based on a value of the output type configuration parameter. The value of the output type configuration parameter may be stored in a configuration data structure retrieved by the decoder integration layer upon initialisation.

In one example of a configured output, the decoder integration layer is configured to output the decoded reconstruction of the original input video signal as one or more buffers. In another example, the decoder integration layer is configured to output the decoded reconstruction of the original input video signal as one or more on-screen surfaces. Alternatively, the decoder integration layer is configured to output the decoded reconstruction of the original input video signal as one or more off-screen textures. Each of these three example outputs may be selected by the output type configuration parameter.

In accordance with another aspect of the invention, there is provided a computer program comprising instructions which, when executed, cause an apparatus to perform a method according to the above-described aspect.

In accordance with a further aspect of the invention, there is provided a computer-readable medium comprising a computer program according to the immediately preceding aspect.

In accordance with a further aspect of the invention, there is provide an apparatus configured to:
receive a video stream at a server application, the video stream being encoded according to a multi-layer coding scheme;
pass, to a base decoder, an encoded base stream comprised by the video stream, for obtaining a decoded base stream; and
pass, to an enhancement decoder, an encoded enhancement stream comprised by the video stream for decoding, wherein an original input video may be reconstructed from the decoded base stream and the decoded enhancement stream.

BRIEF DESCRIPTION OF DRAWINGS

Examples of methods in accordance with the present invention will now be described with reference to the accompanying drawings, wherein like reference numerals indicate like features, and in which.

DETAILED DESCRIPTION

Figure 1:
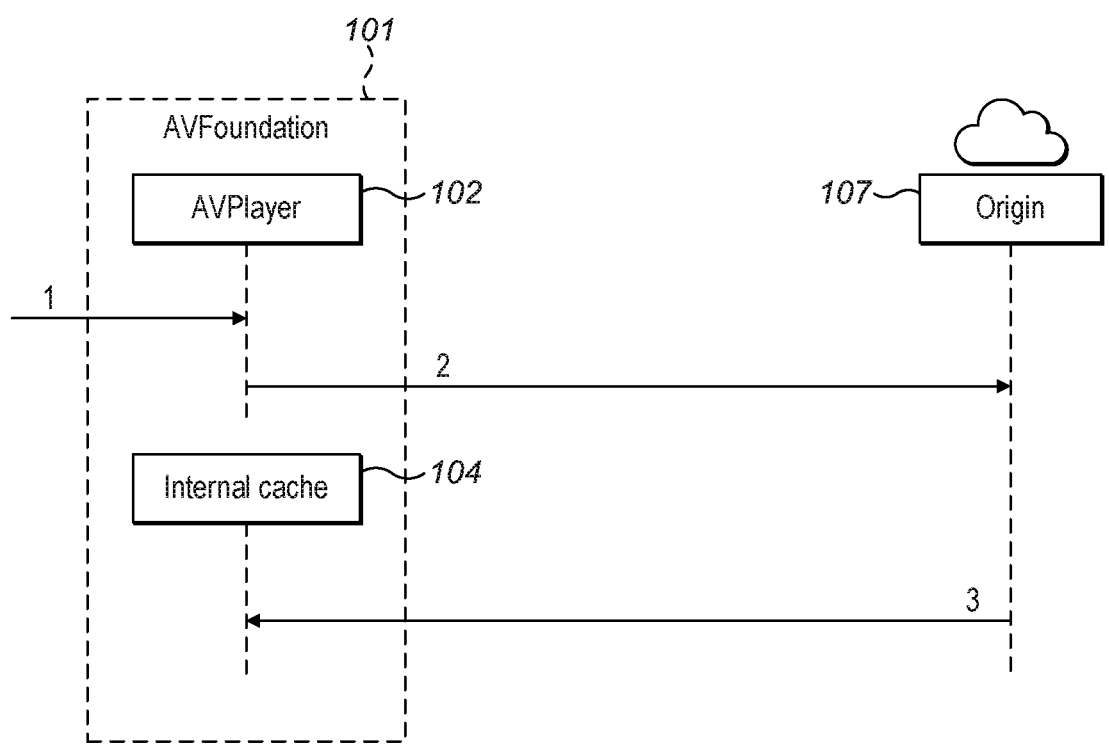
FIG. 1 shows a flow chart showing a method for decoding a video stream according to the prior art.

This disclosure relates to an implementation for integration of a hybrid backward-compatible coding technology with existing decoders, optionally via a software update, and in particular describes an implementation for integration of this approach into an enhanced player adapted for devices on which existing base decoders and players have conventionally been used. In a non-limiting example, the disclosure relates to an implementation and integration of an enhanced player employing an enhancement decoder using MPEG-5 Part 2 Low Complexity Enhancement Video Coding (LCEVC), in the manner described in WO 2022/023739 A1, the contents of which are incorporated herein by reference. LCEVC is a hybrid backward-compatible coding technology which is a flexible, adaptable, highly efficient and computationally inexpensive coding format combining a different video coding format, a base codec (i.e. an encoder-decoder pair such as AVC/H.264, HEVC/H.265, or any other present or future codec, as well as non-standard algorithms such as VP9, AV1 and others) with one or more enhancement levels of coded data. There follows a description of an example LCEVC implementation that may be integrated as part of the enhanced player and methods described subsequently.

Example hybrid backward-compatible coding technologies use a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for being processed using a software implementation. Thus, streams are considered to be a base stream and one or more enhancement streams, where there are typically two enhancement streams possible but often one enhancement stream used. It is worth noting that typically the base stream may be decodable by a hardware decoder while the enhancement stream(s) may be suitable for software processing implementation with suitable power consumption.

The video frame is encoded hierarchically as opposed to using block-based approaches as done in the MPEG family of algorithms. Hierarchically encoding a frame includes generating residuals for the full frame, and then a reduced or decimated frame and so on. In the examples described herein, residuals may be considered to be errors or differences at a particular level of quality or resolution.

The detailed structure of LCEVC is known and set out in the approved draft standards specification. Those skilled in the art will understand how the examples described herein are also applicable to other multi-layer coding schemes (e.g., those that use a base layer and an enhancement layer) based on the general description of LCEVC that is presented in FIG. 1 of WO 2022/023739 A1. The LCEVC decoder works at individual video frame level. It takes as an input a decoded low-resolution picture from a base (H.264 or other) video decoder and the LCEVC enhancement data to produce a decoded full-resolution picture ready for rendering on the display view. The LCEVC enhancement data is typically received either in Supplemental Enhancement Information (SEI) of the H.264 Network Abstraction Layer (NAL), or in an additional track or data Packet Identifier (PID) and is separated from the base encoded video by a demultiplexer. Hence, the base video decoder receives a demultiplexed encoded base stream and the LCEVC decoder receives a demultiplexed encoded enhancement stream, which is decoded by the LCEVC decoder to generate a set of residuals for combination with the decoded low-resolution picture from the base video decoder.

By additional PID we mean additional track or PID. By this we mean not only Transport Stream (PID) but also ISO Base Media File Format and WebM as container types.

Throughout the present description, the invention may be described in the context of NAL units. However, it should be understood that the NAL units in this context may refer equally and more generally to elementary stream input buffers, or equivalent. That is, LCEVC is equally capable of supporting non-MPEG base codecs, i.e. VP8NP9 and AV1, that typically do not use NAL encapsulation. So where a term NAL unit is used, the term may be read to mean an elementary stream input buffer, depending on the base codec utilised.

LCEVC can be rapidly implemented in existing decoders with a software update and is inherently backwards-compatible since devices that have not yet been updated to decode LCEVC are able to play the video using the underlying base codec, which further simplifies deployment.

The decoder implementation to integrate decoding and rendering with existing systems and devices that perform base decoding can be used as part of an extension to existing players and decoding libraries, as described later in this disclosure. The integration is easy to deploy.

The terms LCEVC and enhancement may be used in some examples interchangeably, for example, the enhancement layer may comprise one or more enhancement streams, that is, the residuals data of the LCEVC enhancement data.

Figure 2A:
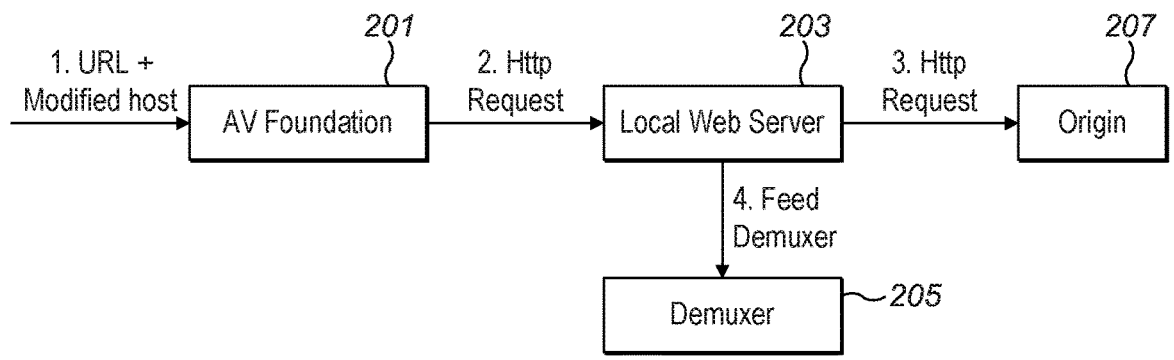
FIGS. 2a and 2b respectively show a flow chart illustrating an example method and an example pipeline for decoding an enhanced video stream in accordance with an embodiment of the present invention.

FIG. 2a of WO 2022/023739 A1 illustrates an unmodified video pipeline. In that conceptual pipeline, obtained or received Network Abstraction Layer (NAL) units are input to a base decoder. The base decoder may, for example, be a low-level media codec accessed using a mechanism such as MediaCodec (e.g. as found in the Android® operating system), VTDecompression Session (e.g. as found in the iOS® operating system) or Media Foundation Transforms (MFT—e.g. as found in the Windows® family of operating systems), depending on the operating system. The output of the pipeline is a surface representing the decoded original video signal (e.g. a frame of such a video signal, where sequential display of success frames renders the video).

Figure 2B:
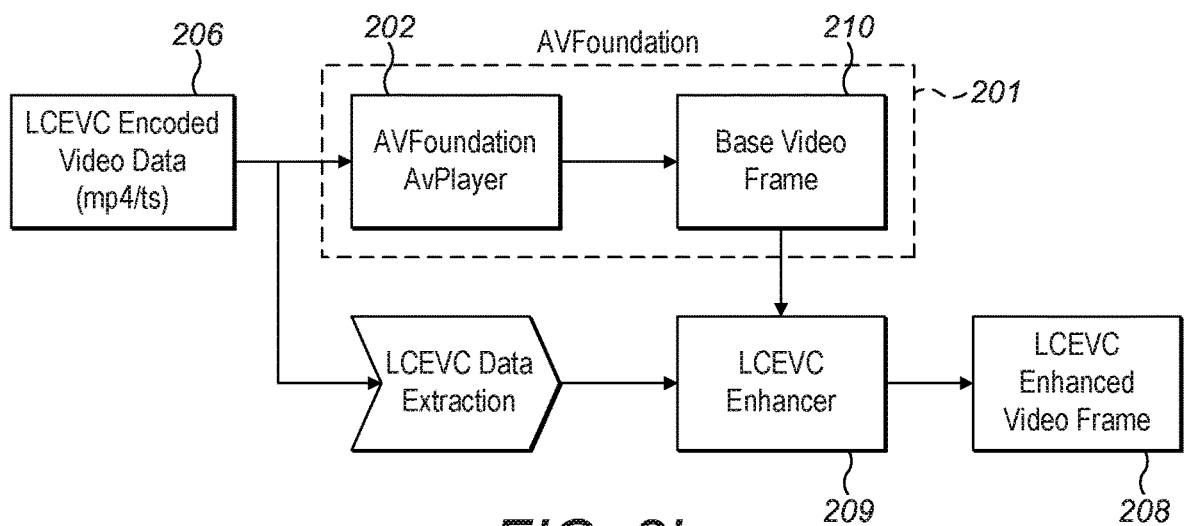

FIG. 2b of WO 2022/023739 A1 illustrates a proposed video pipeline using an LCEVC decoder integration layer, conceptually. Like the previously described comparative video decoder pipeline, NAL units are obtained or received and are processed by an LCEVC decoder to provide a surface of reconstructed video data. Via the use of the LCEVC decoder, the surface may be higher quality than the comparative surface or the surface may be at the same quality as the comparative surface but require fewer processing and/or network resources.

As noted above, when we refer to NAL units here, we refer to elementary stream input buffers, or equivalent, depending on the base codec used.

In FIG. 2b of WO 2022/023739 A1, the LCEVC decoder is implemented in conjunction with a base decoder. The base decoder may be provided by a variety of mechanisms, including by an operating system function as discussed above (e.g. may use a MediaCodec, VTDecompression Session or MFT interface or command). The base decoder 26 may be hardware accelerated, e.g. using dedicated processing chips to implement operations for a particular codec. The base decoder may be the same base decoder described previously and that is used for other non-LCEVC video decoding, e.g. may comprise a pre-existing base decoder.

In FIG. 2b of WO 2022/023739 A1, the LCEVC decoder is implemented using a decoder integration layer (DIL). The decoder integration layer acts to provide a control interface for the LCEVC decoder, such that a client application may use the LCEVC decoder in a similar manner to the previous base decoder, e.g. as a complete solution from buffer to output. The decoder integration layer functions to control operation of a decoder plug-in (DPI) and an enhancement decoder to generate a decoded reconstruction of an original input video signal. In certain variations, as shown in Figure, the decoder integration layer may also control GPU functions such as GPU shaders to reconstruct the original input video signal from the decoded base stream and the decoded enhancement stream.

NAL units comprising the encoded video signal together with associated enhancement data may be provided in one or more input buffers. The input buffers may be fed by a similar non-MPEG elementary stream input buffer, such as used for example in VP8/VP9 or AV1. The input buffers may be fed (or made available) to the base decoder and to the decoder integration layer, in particular the enhancement decoder that is controlled by the decoder integration layer. In certain examples, the encoded video signal may comprise an encoded base stream and be received separately from an encoded enhancement stream comprising the enhancement data; in other preferred examples, the encoded video signal comprising the encoded base stream may be received together with the encoded enhancement stream, e.g. as a single multiplexed encoded video stream. In the latter case, the same buffers may be fed (or made available) to both the base decoder and to the decoder integration layer. In this case, the base decoder may retrieve the encoded video signal comprising the encoded base stream and ignore any enhancement data in the NAL units. For example, the enhancement data may be carried in SEI messages for a base stream of video data, which may be ignored by the base decoder if it is not adapted to process custom SEI message data. In this case, the base decoder may operate as per the base decoder in Figure, although in certain cases, the base video stream may be at a lower resolution that comparative cases.

On receipt of the encoded video signal comprising the encoded base stream, the base decoder is configured to decode and output the encoded video signal as one or more base decoded frames. This output may then be received or accessed by the decoder integration layer for enhancement. In one set of examples, the base decoded frames are passed as inputs to the decoder integration layer in presentation order.

The decoder integration layer extracts the LCEVC enhancement data from the input buffers and decodes the enhancement data. Decoding of the enhancement data is performed by the enhancement decoder, which receives the enhancement data from the input buffers as an encoded enhancement signal and extracts residual data by applying an enhancement decoding pipeline to one or more streams of encoded residual data. For example, the enhancement decoder may implement an LCEVC standard decoder as set out in the LCEVC specification.

A decoder plug-in is provided at the decoder integration layer to control the functions of the base decoder. In certain cases, the decoder plug-in may handle receipt and/or access of the base decoded video frames and apply the LCEVC enhancement to these frames, preferably during playback. In other cases, the decoder plug-in may arrange for the output of the base decoder to be accessible to the decoder integration layer, which is then arranged to control addition of a residual output from the enhancement decoder to generate the output surface. Once integrated in a decoding device, the LCEVC decoder enables decoding and playback of video encoded with LCEVC enhancement. Rendering of a decoded, reconstructed video signal may be supported by one or more GPU functions such as GPU shaders that are controlled by the decoder integration layer.

In general, the decoder integration layer controls operation of the one or more decoder plug-ins and the enhancement decoder to generate a decoded reconstruction of the original input video signal using a decoded video signal from the base encoding layer (i.e. as implemented by the base decoder) and the one or more layers of residual data from the enhancement encoding layer (i.e. as implemented by the enhancement decoder). The decoder integration layer provides a control interface, e.g. to applications within a client device, for the video decoder.

Depending on configuration, the decoder integration layer may output the surface of decoded data in different ways. For example, as a buffer, as an off-screen texture or as an on-screen surface. Which output format to use may be set in configuration settings that are provided upon creation of an instance of the decoding integration layer, as further explained below.

In certain implementations, where no enhancement data is found in the input buffers, e.g. where the NAL units do not contain enhancement data, the decoder integration layer may fall back to passing through the video signal at the lower resolution to the output, that is, the output of the base decoding layer as implemented by the base decoder. In this case, the LCEVC decoder may operate as per the video decoder pipeline.

The decoder integration layer can be used for both application integration and operating system integration, e.g. for use by both client applications and operating systems. The decoder integration layer may be used to control operating system functions, such as function calls to hardware accelerated base codecs, without the need for a client application to have knowledge of these functions. In certain cases, a plurality of decoder plug-ins may be provided, where each decoder plug-in provides a wrapper for a different base codec. It is also possible for a common base codec to have multiple decoder plug-ins. This may be the case where there are different implementations of a base codec, such as a GPU accelerated version, a native hardware accelerated version and an open-source software version.

The decoder plug-ins may be considered integrated with the base decoder or alternatively a wrapper around that base decoder. The decoder integration layer conceptually includes functionality to extract the enhancement data from the NAL units, functionality to communicate with the decoder plug-ins and apply enhancement decoded data to base decoded data and one or more GPU functions.

The set of decoder plug-ins are configured to present a common interface (i.e. a common set of commands) to the decoder integration layer, such that the decoder integration layer may operate without knowledge of the specific commands or functionality of each base decoder. The plug-ins thus allow for base codec specific commands, such as MediaCodec, VTDecompression Session or MFT, to be mapped to a set of plug-in commands that are accessible by the decoder integration layer (e.g. multiple different decoding function calls may be mapped to a single common plug-in "Decode( . . . )" function).

Since the decoder integration layer effectively comprises a 'residuals engine', i.e. a library that from the LCEVC encoded NAL units produces a set of correction planes at different levels of quality, the layer can behave as a complete decoder (i.e. the same as decoder) through control of the base decoder.

For simplicity, we will refer to the instructing entity here as the client but it will be understood that the client may be considered to be any application layer or functional layer and that the decoder integration layer may be integrated simply and easily into a software solution. The terms client, application layer and user may be used herein interchangeably.

In an application integration, the decoder integration layer may be configured to render directly to an on-screen surface, provided by a client, of arbitrary size (generally different from the content resolution). For example, even though a base decoded video may be Standard Definition (SD), the decoder integration layer using the enhancement data, may render surfaces at High Definition (HD), Ultra High Definition (UHD) or a custom resolution. Further details of out-of-standard methods of upscaling and post-processing that may be applied to a LCEVC decoded video stream are found in PCT/GB2020/052420, the contents of which are incorporated herein by reference. Example application integrations include, for example, use of the LCEVC decoder by a media player configured to decode LCEVC video streams by using the LCEVC decoder "under the hood", where computer program code for media player functions is configured to use and call commands provided by the decoder integration layer, i.e. the control interface of the LCEVC decoder, as will be described in greater detail later in this disclosure.

In an operating system integration, the decoder integration layer may be configured to decode to a buffer or draw on an off-screen texture of the same size of the content final resolution. In this case, the decoder integration layer may be configured such that it does not handle the final render to a display, such as a display device. In these cases, the final rendering may be handled by the operating system, and as such the operating system may use the control interface provided by the decoder integration layer to provide LCEVC decoding as part of an operating system call. In these cases, the operating system may implement additional operations around the LCEVC decoding, such as YUV to RGB conversion, and/or resizing to the destination surface prior to the final rendering on a display device. Examples of operating system integration include integration with (or behind) MFT decoder for Microsoft Windows® operating systems or with (or behind) Open Media Acceleration (OpenMAX—OMX) decoder, OMX being a C-language based set of programming interfaces (e.g. at the kernel level) for low power and embedded systems, including smartphones, digital media players, games consoles and set-top boxes.

These modes of integration may be set by a client device or application and the mechanism for selection and configuration will be described in more detail below.

The configuration and use of a decoder integration layer, allows LCEVC decoding and rendering to be integrated with many different types of existing legacy (i.e. base) decoder implementations. For example, the configuration may be seen as a retrofit for the configuration as may be found on computing devices. Further examples of integrations include the LCEVC decoding libraries being made available within common video coding tools such as FFmpeg and FFplay. For example, FFmpeg is often used as an underlying video coding tool within client applications. By configuring the decoder integration layer as a plug-in or patch for FFmpeg, an LCEVC-enabled FFmpeg decoder may be provided, such that client applications may use the known functionalities of FFmpeg and FFplay to decode LCEVC (i.e. enhanced) video streams. For example an LCEVC-enabled FFmpeg decoder may provide video decoding operations, such as: playback, decoding to YUV and running metrics (e.g. peak signal-to-noise ratio—PSNR or Video Multimethod Assessment Fusion—VMAF—metrics) without having to first decode to YUV. This may be possible by the plug-in or patch computer program code for FFmpeg calling functions provided by the decoder integration layer.

Example implementations are now described in which LCEVC-enhanced video decoding capabilities are added to an iOS application based on the native AVPlayer. It will be understood that an AVPlayer is a controller object used with devices running iOS operating systems for instance to manage the playback and timing of a media asset.

FIG. 1 shows a flow diagram illustrating interactions in a conventional foundation in which an application within an AVFoundation framework 101 obtains, decodes, and plays a video asset. As those skilled in the art will understand, AVFoundation is an existing framework for handling time-based audiovisual media on iOS, macOS, watchOS and tvOS operating systems. A command or request 1 is received at the AVPlayer instance 102 running on an iOS device, signalling that a media asset, in this example a video asset, is to be played. In response, the AVPlayer transmits an HTTP request 2 to an origin server 107, for example a server of a video streaming platform. The video asset is transmitted 3 from the origin server to the AVFoundation internal cache 104 for playing on the iOS device.

FIG. 2a depicts an example interaction that may form part of the present method. In this example, a local web server application 203 is provided on the iOS device, and is configured to intercept requests for assets sent by AVFoundation. The request 1 received by AVFoundation 201 includes additional information to enable this modified interaction. In particular, the request to play the video asset includes an indication of a modified host. Accordingly, then the AVFoundation application sends an HTTP request for the video content, the request is not transmitted directly to the origin server 207, but is instead received by the local web server application. It is the said web server that then sends to the origin the request for the video asset. In response, the origin transmits the requested encoded stream to the entity from which it received the request, namely the web server. The received video stream includes a encoded base stream and an enhancement stream encoded in accordance with the above-described LCEVC scheme. The LCEVC encoded video includes extra information that the LCEVC enhancer 209 can use to improve the quality and resolution of the image once it is rendered. The encoded base stream is returned from the local web server to the AVPlayer 202 within the AVFoundation framework 201 and is decoded in accordance with the conventional base coding scheme used by the AVPlayer base decoder. The enhancement stream is passed 4 to the demuxer 205, from which demuxed video streams are passed to a DI L for decoding. Subsequently decoded base frames 210 are transmitted to the DI L and a renderer plays the combined base and enhancement stream so that the reconstructed video is played by the relevant iOS application. FIG. 2b shows the receipt and handling of the encoded video data 206 as it is delivered from the local server application. The result of the enhancement process is a new frame 208 to be displayed. The rendering of the frames is handled in this example by LCEVCAVPlayerKit libraries, which provide a custom UI View to be used to render the video.

Example implementations for integrating this enhancement process with the AVFoundation framework and AVPlayer can involve the following components. The LCEVC process is encapsulated inside a single class, which facilitates a simple and rapid integration. LCEVCAVPlayer is a subtype of AVPlayer that adds the required interceptions and processes to generate the enhanced video. This class is compatible with the standard components that make use of AVPlayer and adds:

outputVideoView: A read-only property that allows at any point to get a reference to the view containing the enhanced version of the video. This view is maintained and created by the player and it can be easily integrated into any existing view.

renderIn: This function handles the initialization and configuration of the outputVideoView as a sub-View of the provided parent view, creating the required constraints for it to fill its parent. If the client application has custom layout management this call can be skipped.

width: A read-only property returning the width of the enhanced video. Normally this property is only useful for debugging purposes, but it can be essential if the client application needs to manipulate the layout of the application.

height: A read-only property returning the width of the enhanced video. Normally this property is only useful for debugging purposes, but it can be essential if the client application needs to manipulate the layout of the application.

Figure 5:
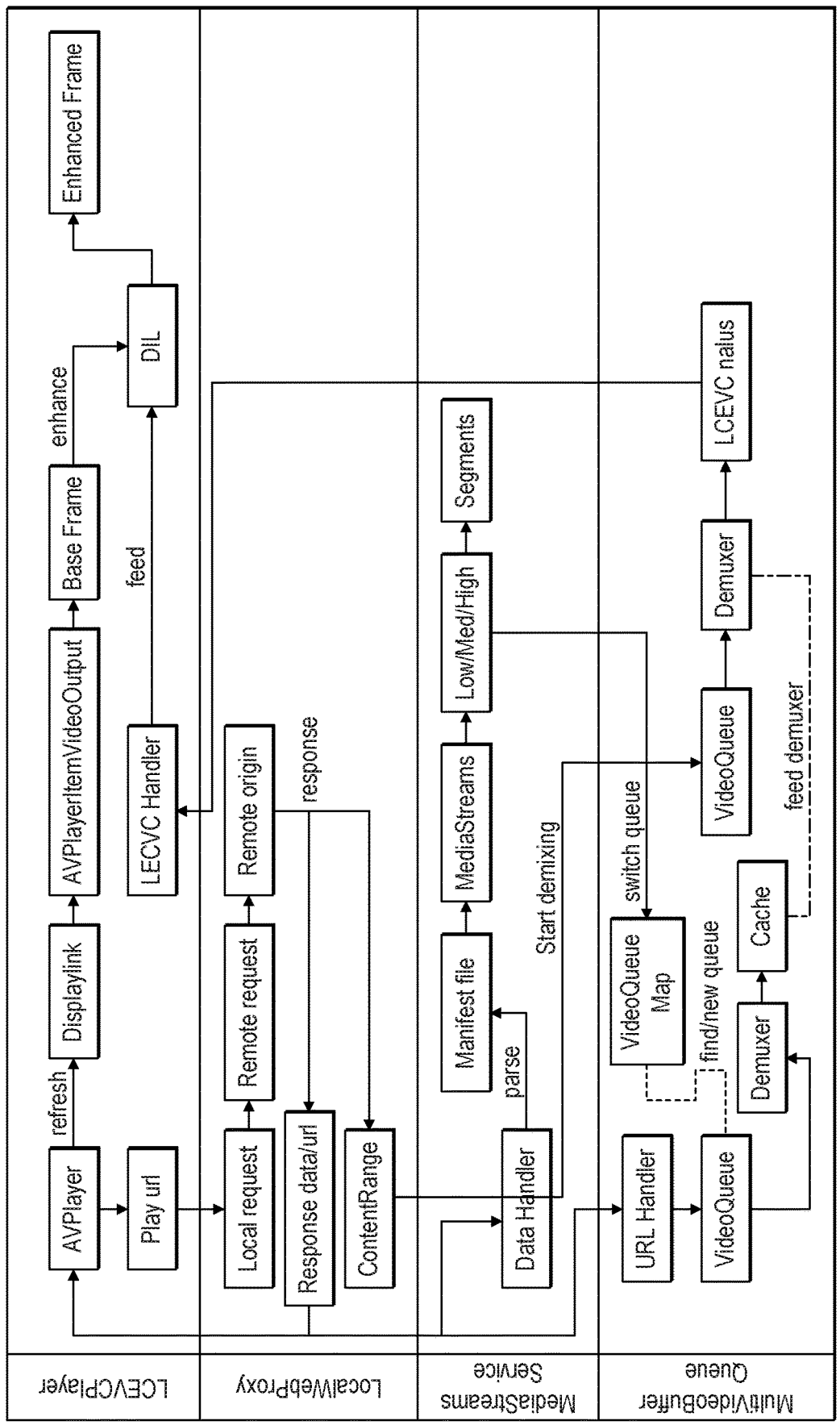
FIG. 5 shows a flow chart illustrating an example method in accordance with an embodiment of the present invention including a TS pipeline.
Figure 6:
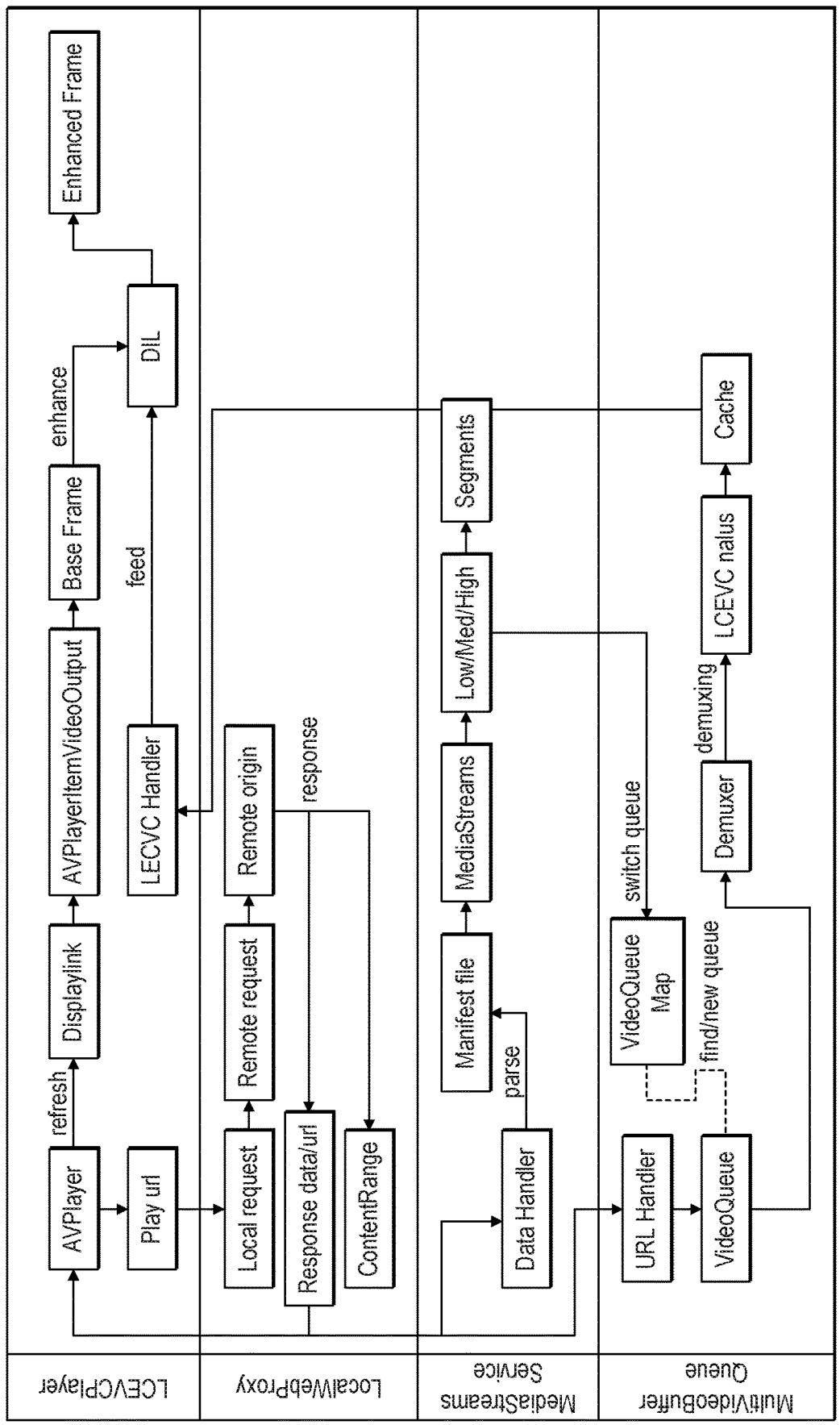
FIG. 6 shows a flow chart illustrating an example method in accordance with an embodiment of the present invention including an MP4 pipeline.

More detailed flows corresponding to the above-described interception and decoding process are shown in FIGS. 5 and 6, which also illustrate the architecture of example implementations.

Examples described herein include an extension to the Apple AVFoundation library VTDecompressionSession (VTDS) called LCEVCDecompressionSession. An iOS player can use LCEVCDecompressionSession instead of VTDS to parse streams and decode LCEVC when present. With these implementations, LCEVC decoding is made available on iOS devices via simple patches to VLCKit's basic framework along with an LCEVC library. Advantageously LCEVC may be readily integrated into VLCKit and other iOS players.

In these examples, using the DIL, LCEVCDecompressionSession extracts LCEVC enhancement data and applies it to the base video, prepared to conform to Apple's decoder module specifications. Advantageous modification for the native AVPlayer have been developed, referred to as LCEVC AVPlayer. LCEVC AVPlayer is a sub-class of the native AVPlayer and inherits the same core functionality and behaviours, for example ABR handling, which is described in more detail later in this disclosure.

Any iOS application using the native AVPlayer can thereby be quickly updated to incorporate the LCEVC decoding libraries and minor code changes. LCEVC AVPlayer can be used both with native controls (AVPlayerViewController) or with custom controls.

Example processes for integrating the LCEVC AVPlayer on an iOS device are now described.

A first integration approach uses AVPlayerViewController. LCEVCAVPlayerKit libraries are compatible with applications that use native iOS Player controls provided by AVFoundation using the AVPlayerViewcontroller.

Firstly the frameworks are imported. AVPlayerViewController requires the Apple AVKit framework, which is imported accordingly. In the present example this is called LCEVCAVPlayerKit. An instance of LCEVCAVPlayer is then created, providing the remote URL of an asset to be played. This is a subclass of AVPlayer and can be used in place of a conventional AVPlayer instance.

Once the LCEVCAVPlayer instance is created, it can be provided to the a AVPlayerViewController using its player property, and the renderIn method of LCEVCAVPlayer can be called. This causes the enhanced video to be rendered to a provided superlayer. This results in an LCEVC-enhanced video will be displayed with the native iOS player controls provided by AVFoundation.

A second example integration approach uses LCEVCAVPlayer directly. This implementation is suitable if a greater degree of control over the playback UI controls or further customization of a player are required.

Firstly an instance of UIView is added into the relevant application. This is to hold the enhanced video. This can be performed either programmatically or using storyboards. The LCEVCAVPlayerKit framework is then imported.

An instance of LCEVCAVPlayer is created and maintained, via a ViewController, providing the URL of the remote stream to be played. This player exposes capabilities of the standard AVPlayer. Once the view has been created, for example when the viewDidLoad trigger gets called, an addObserver function can be added on the player to monitor and react to the different status changes by using the key path AVPlayer.status. This causes a callback to be fired for every player status change. The LCEVCAVPlayer is provided with the required rendering target at this point. The targetView argument refers to the UIView where the LCEVCAVPlayer is to insert the output rendering target. It is configured to stretch in order to fill its parent. If manual management of the layout is required, that view may be accessed using the outputVideoView property.

This the implemention is configured and able to handle enhanced video data. The observer previously defined may be used to trigger playback by catching the status readyTo-Play where it is safe to use the default play method of the AVPlayer to start the playback session.

As described above, in the present example, LCEVC AVPlayer makes use of a local web server to intercept requests performed by AVFoundation. This approach is secure because the included server is configured to reject any request that does not originate from the local device. The example implementation of the enhancer internally intercepts and modifies the requested URLs in order to extract the LCEVC enhancement data.

Figure 3:
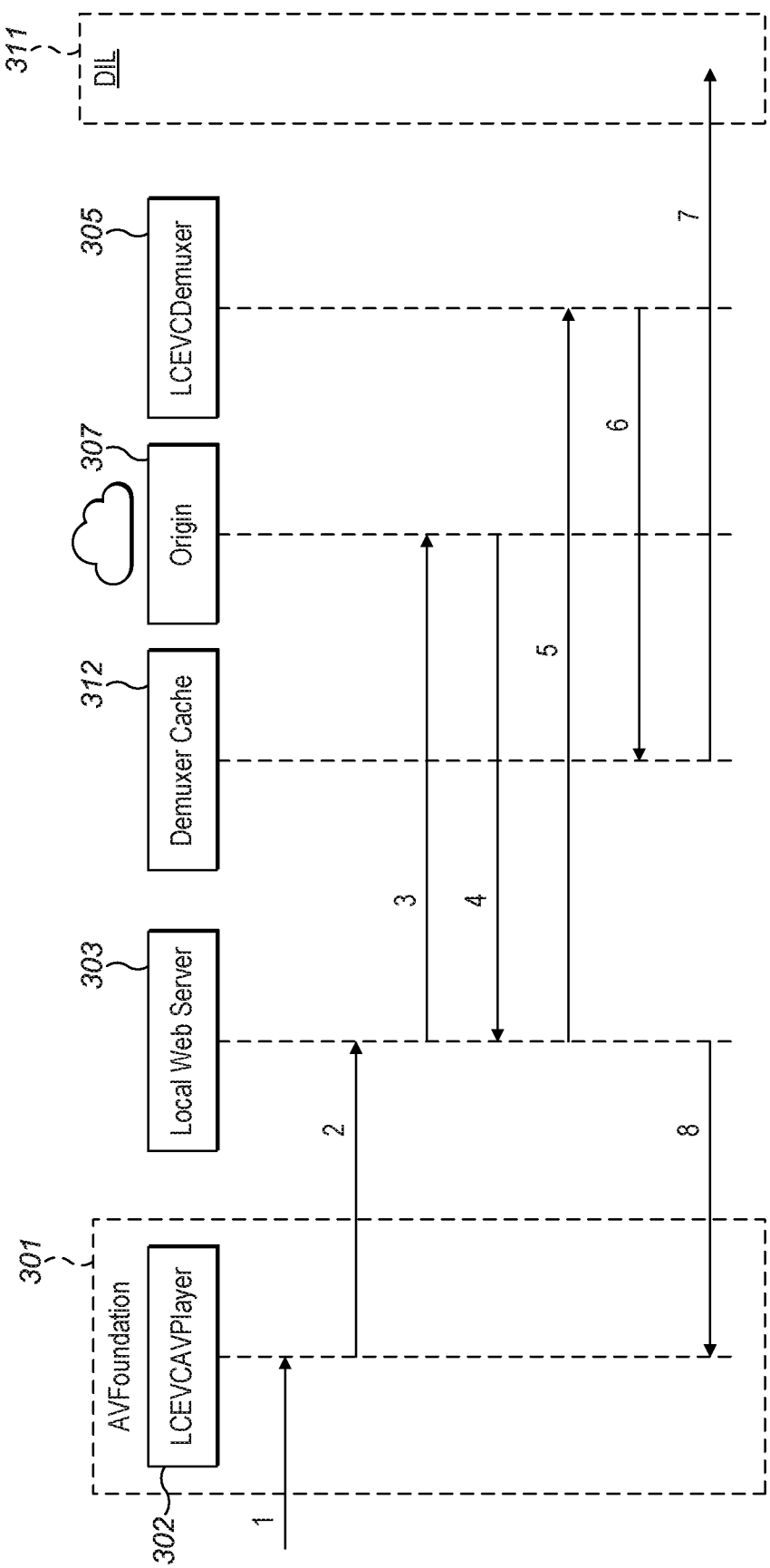
FIG. 3 shows a flow chart illustrating an example method in accordance with an embodiment of the present invention including a TS pipeline.
Figure 4:
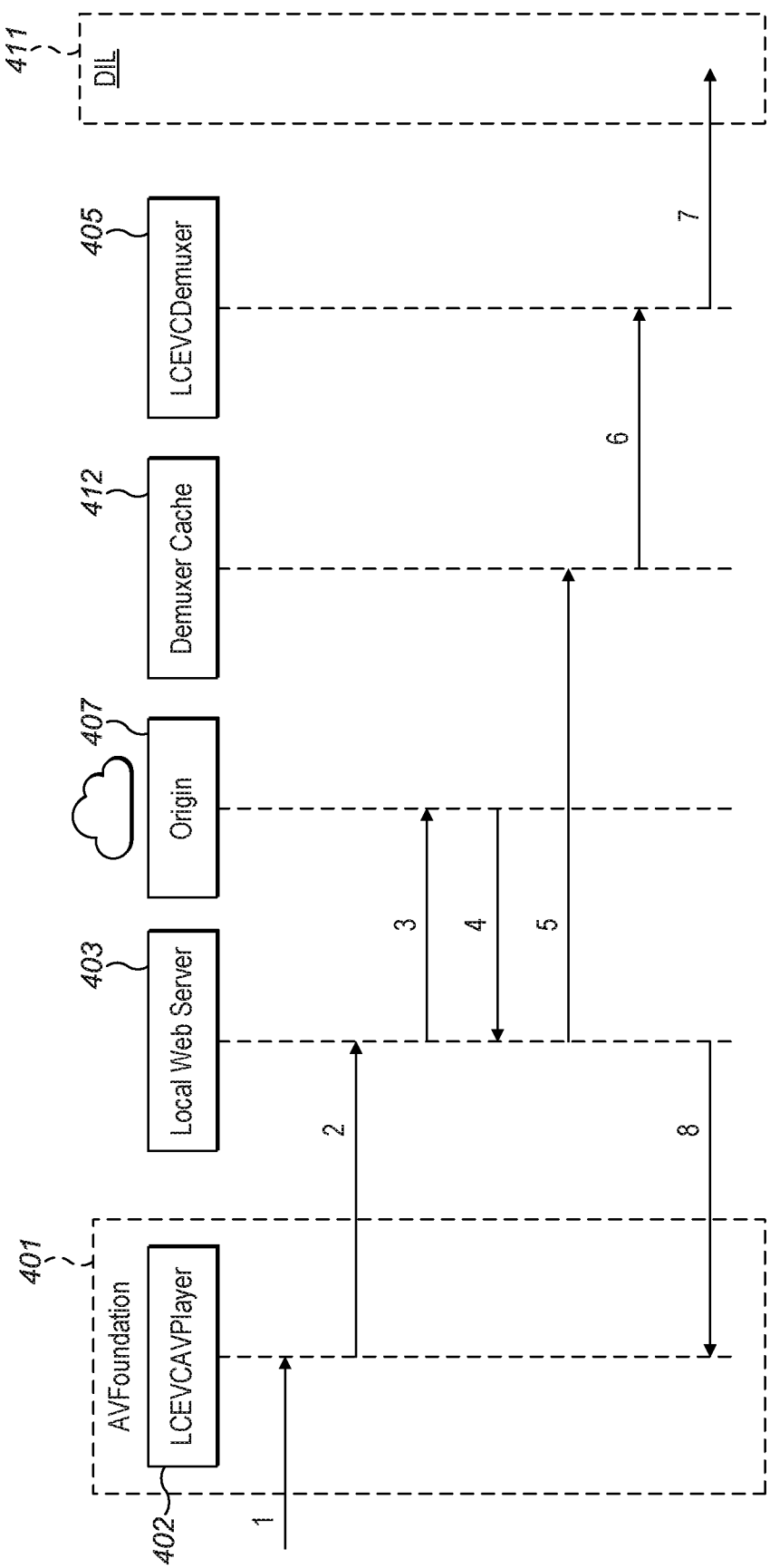
FIG. 4 shows a flow chart illustrating an example method in accordance with an embodiment of the present invention including an MP4 pipeline.

FIGS. 3-12 are flow diagrams illustrating examples of implementations involving AVPlayer. As shown in FIGS. 3 and 4 for instance, AVPlayer 302 initially makes an HTTP request 2 to the origin 307 asking for a resource to play. Such request has the URL modified so that rather than reporting back directly to AVPlayer in response to the request 3, the Origin can return the result 4 of the request to the local web server 303.

Once a response is produced, this is dispatched both to AVPlayer and to the ByteRangeBasedCache. An example AVPlayer pipeline and an MP4 Demuxer Pipeline are shown in the aforementioned figures.

The AVPlayer Pipeline operates as follows. AVPlayer performs the decoding of the base. It is possible to extract the frame of the requested video asset that is going to be displayed on-screen through the AVPlayerItemVideoOutput, more specifically using the CADisplayLinkCallback. This callback is called periodically and it is in sync with the frame rate of the stream being played. This frame will then be passed 7 to the DI L 311 to produce the enhanced frame.

In the MP4 Demuxer Pipeline, the MP4 demuxer requests a specific data byterange in order to perform the demuxing. This data is to be provided by the ByteRangeBasedCache 412. Once the demuxer has concluded the demuxing, it produces an Access Unit that is to be fed to the DIL using the DIL_AddNalUnitData API.

There is a maximum number of LCEVC packets that can be stored in the DIL (20 in the present example). The DIL is typically configured to request more once the number of held packets is lower than that value. A reason for this constraint is that adding the product of the demuxer directly to the DIL can cause the DIL to allocate a large amount of memory (typically more than 1 GB).

Upon an LCEVC packet being fed to the DIL, the PTS is also added to a buffer to keep track of the PTS currently contained in the DIL, called videoBuffersFedTimeList. In order to produce the final, enhanced frame, the DIL requires the base frame (generated as explained above) and the PTS of the LCEVC data that is to be paired with the base frame.

Since the time information for the base frame corresponds to a screen timestamp and not the actual presentation time stamp, in to pair up the base frame with an LCEVC block, the LCEVC block with the closest PTS to the time value reported on the base frame is sought. The first time a base frame and an LCEVC packet are paired, a delta is computed, so that, keeping that into account, it is possible to rely on the fact that the time information reported on the base frame plus the computed delta will have a one-to-one match with the PTS on one of the LCEVC blocks extracted by the MP4 demuxer.

Once both the base frame and the PTS of the corresponding LCEVC block are found, these two pieces of information are passed to the DIL_Decode API to produce the enhanced output.

As alluded to above, the first part of the pipeline regarding the WebProxyServer is common to both MP4 and TS. There is no ByteRangeBasedCache for TS, and accordingly the data received from the HTTP requests is instead directly passed to the TS demuxer that produces an Access Unit. Said Access Unit is then stored in a cache (TimeBasedCacheManager) which is in charge to keep the NAL Units ordered according to their PTS. The TimeBasedCacheManager is then to provide the next frame to be fed to the DIL when asked through the variable nextBuffer.

Before being fed to the DIL, the NAL units are stored in a LcevcVideoBufferQueue (LVBQ) object, which are kept inside an instance of LcevcMultiVideoBufferQueue (LMVBQ) that may hold one or more instances of LVBQ class at the same time.

The number of the LVBQ instances held by a LMVBQ is dictated by the number of profiles in the playlist manifest (TS/FMP4).

Figure 11:
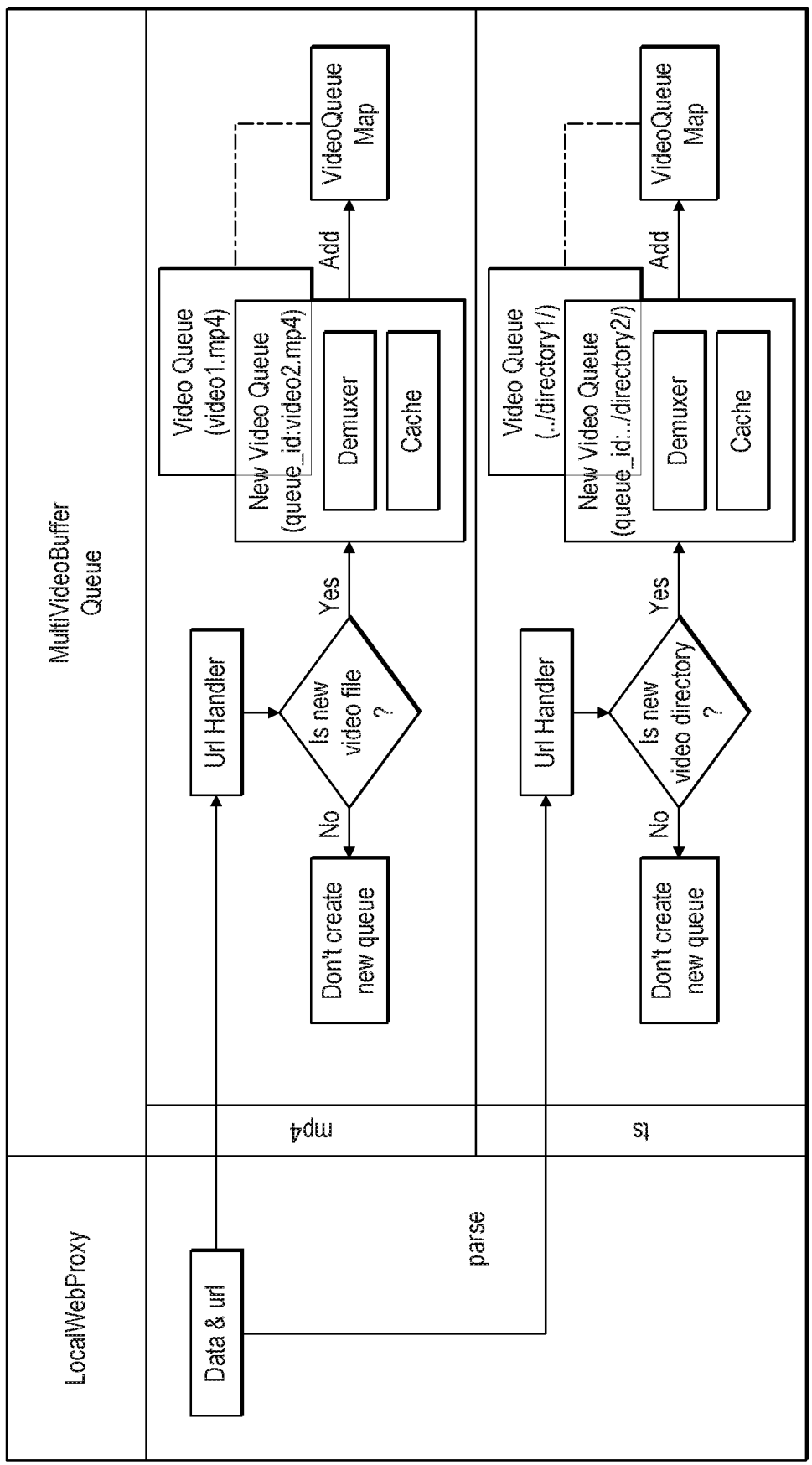
FIG. 11 shows a flow chart illustrating an example method in accordance with an embodiment of the present invention including creating a new MultiVideoQueue queue.
Figure 12:
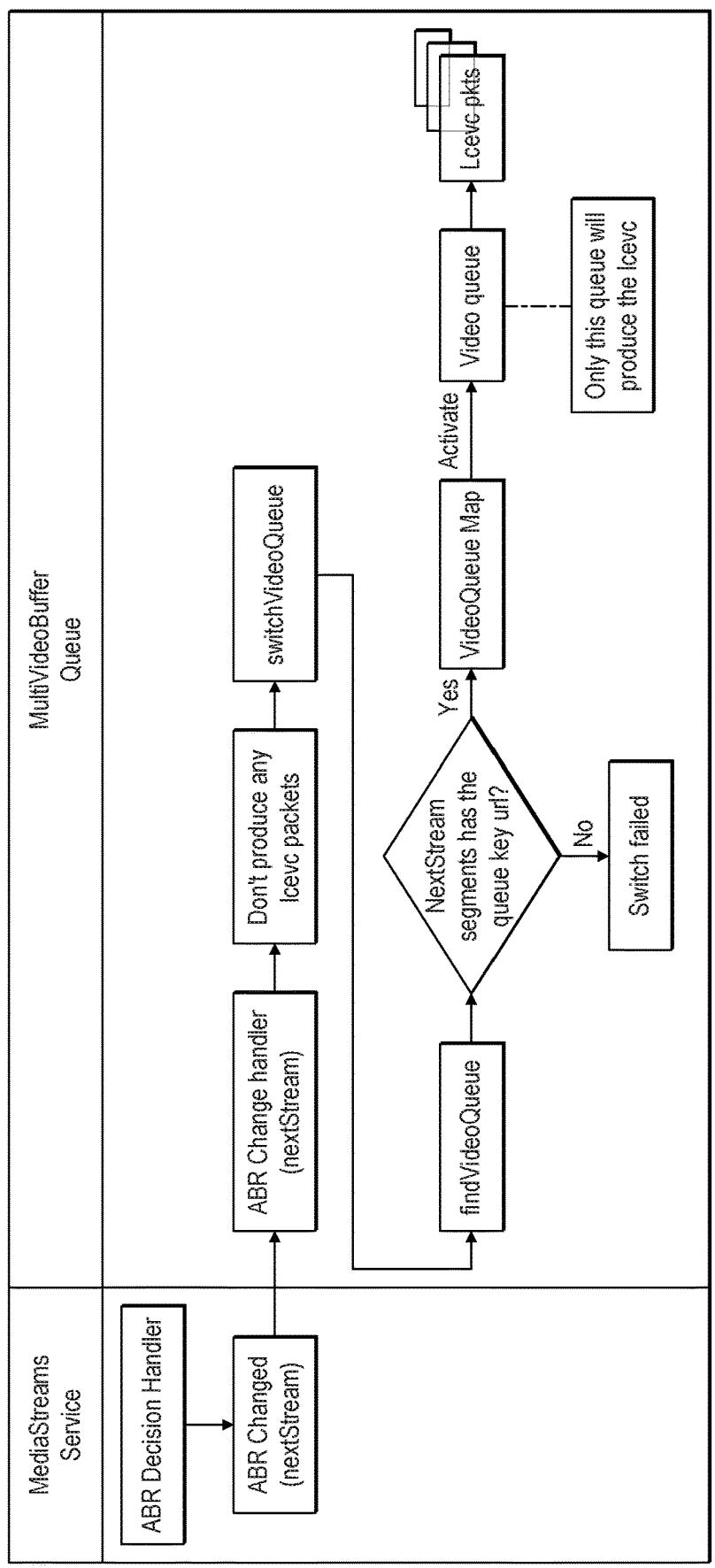
FIG. 12 shows a flow chart illustrating an example method in accordance with an embodiment of the present invention including activating a MultiVideoQueue queue.

Every time a new piece of data is received, the LMVBQ checks if the LVBQ for that specific URL has already been created. If it has, then that data gets added to the existing LVBQ; if not, another one is created, as illustrated in FIG. 11.

Each one of these LVBQ holds a local instance of the corresponding Cache (ByteRangeBasedCache for MP4 and imeBasedCacheManger for TS) and Demuxer and has a unique ID produced using the URL (handleVideoDataURL-Requested contains the logic to create said ID). In the present example, there can only be one active LVBQ at any given time, which represents the profile currently being played on the screen.

Figure 8:
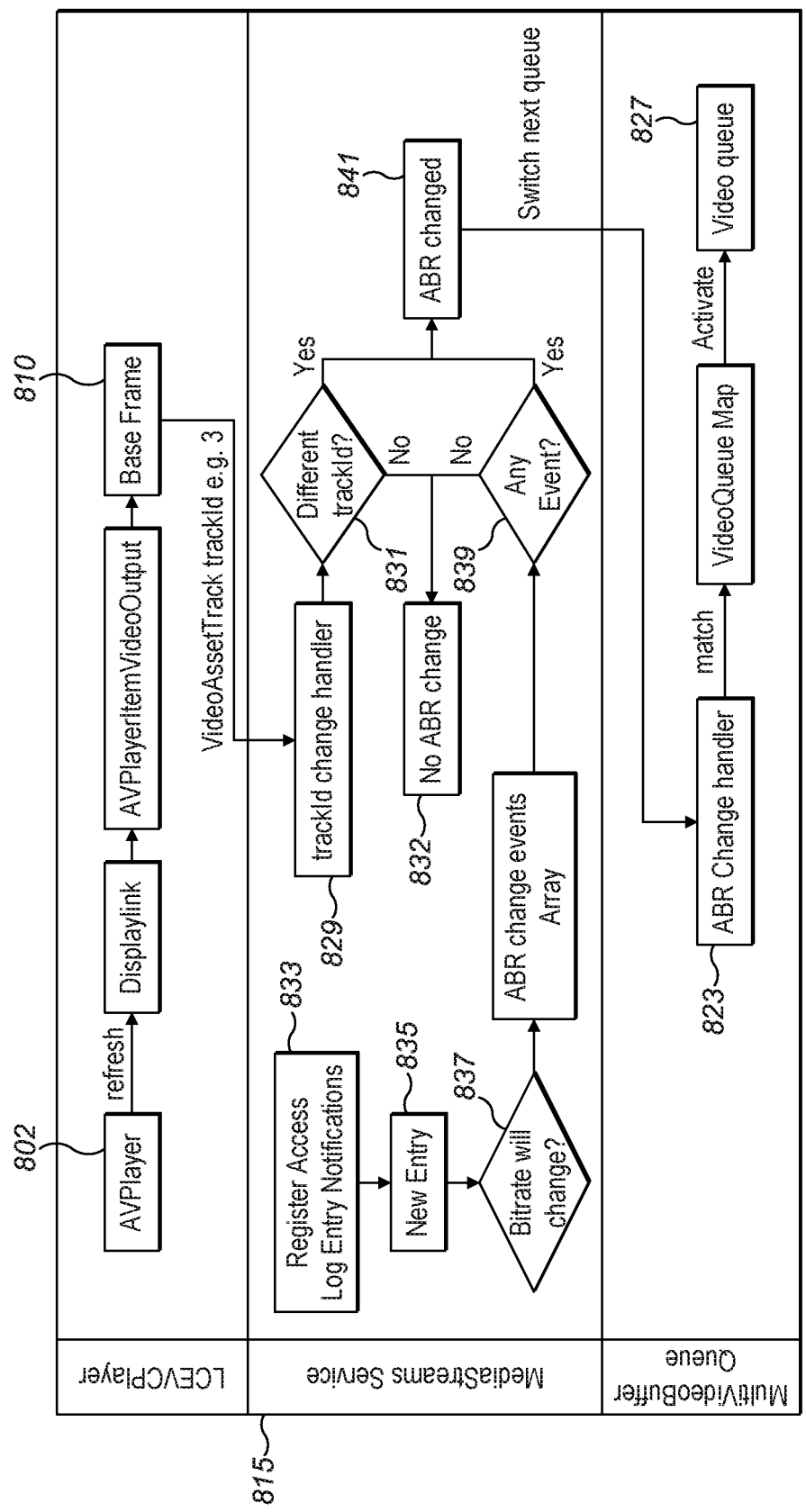
FIG. 8 is a flow diagram depicting another example of a method in accordance with an embodiment of the present invention including detecting an ABR profile change using a VideoAssetTrack trackId identifier associated with the video stream.
Figure 9:
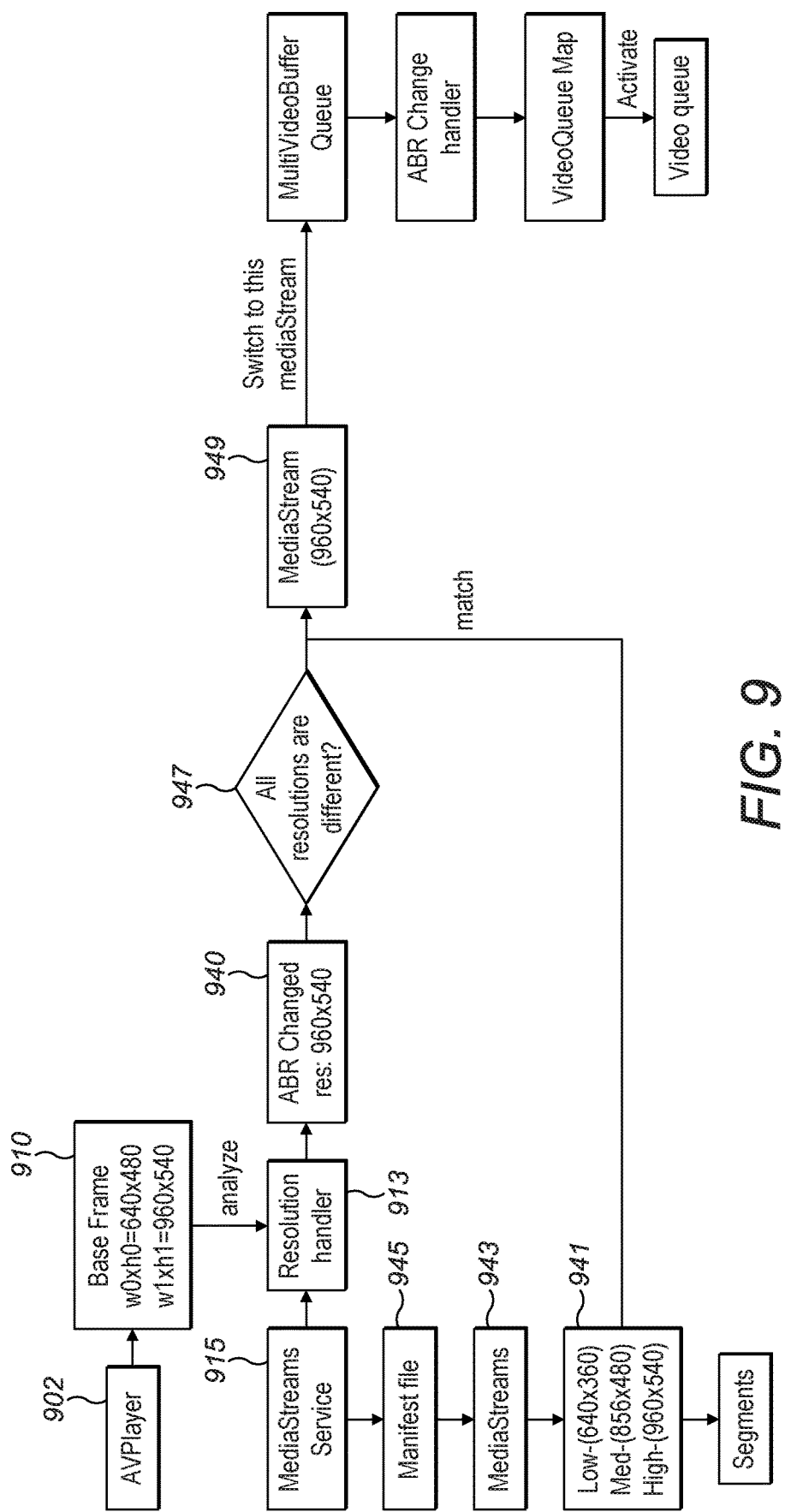
FIG. 9 is a flow diagram depicting an example method in accordance with an embodiment of the present invention including identifying a changed ABR profile when all profile resolutions are different.
Figure 10:
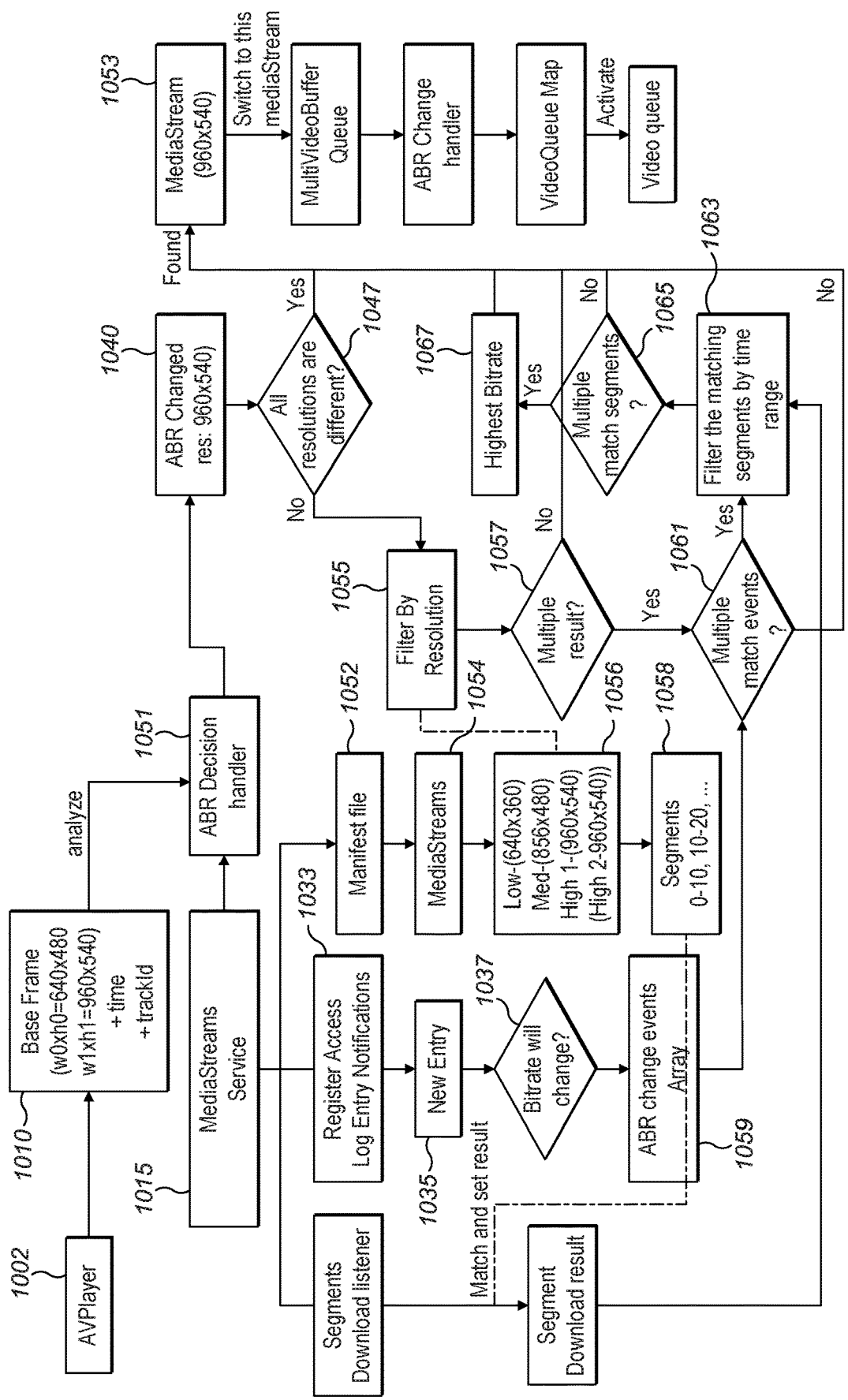
FIG. 10 is a flow diagram depicting an example method in accordance with an embodiment of the present invention including identifying a changed ABR profile when two or more profile resolutions are identical.

The detection of ABR profile changes is shown in the examples depicted at FIGS. 9 and 10. In the flow shown in the latter, some profiles correspond to the same video resolution. As noted earlier in this disclosure, AVPlayer provides a notification when a profile switch is about to happen. However, unfortunately, the notification does not indicate the precise point in time when the switch happens, it merely indicates that a change is imminent. In order to provide a more reliable way to understand when such switch actually happens, three different things are taken into account as shown in FIG. 7-9: the aforementioned AVPlayer notification, the resolution of the base and the TrackID of the AVAsset currently being played.

When determining whether the profile has changed using the resolution, it suffices to check for every extracted base frame, and determined whether the resolution matches the one of the previously extracted one. If the resolution does not match, then the current LVBQ needs to change.

Figure 7:
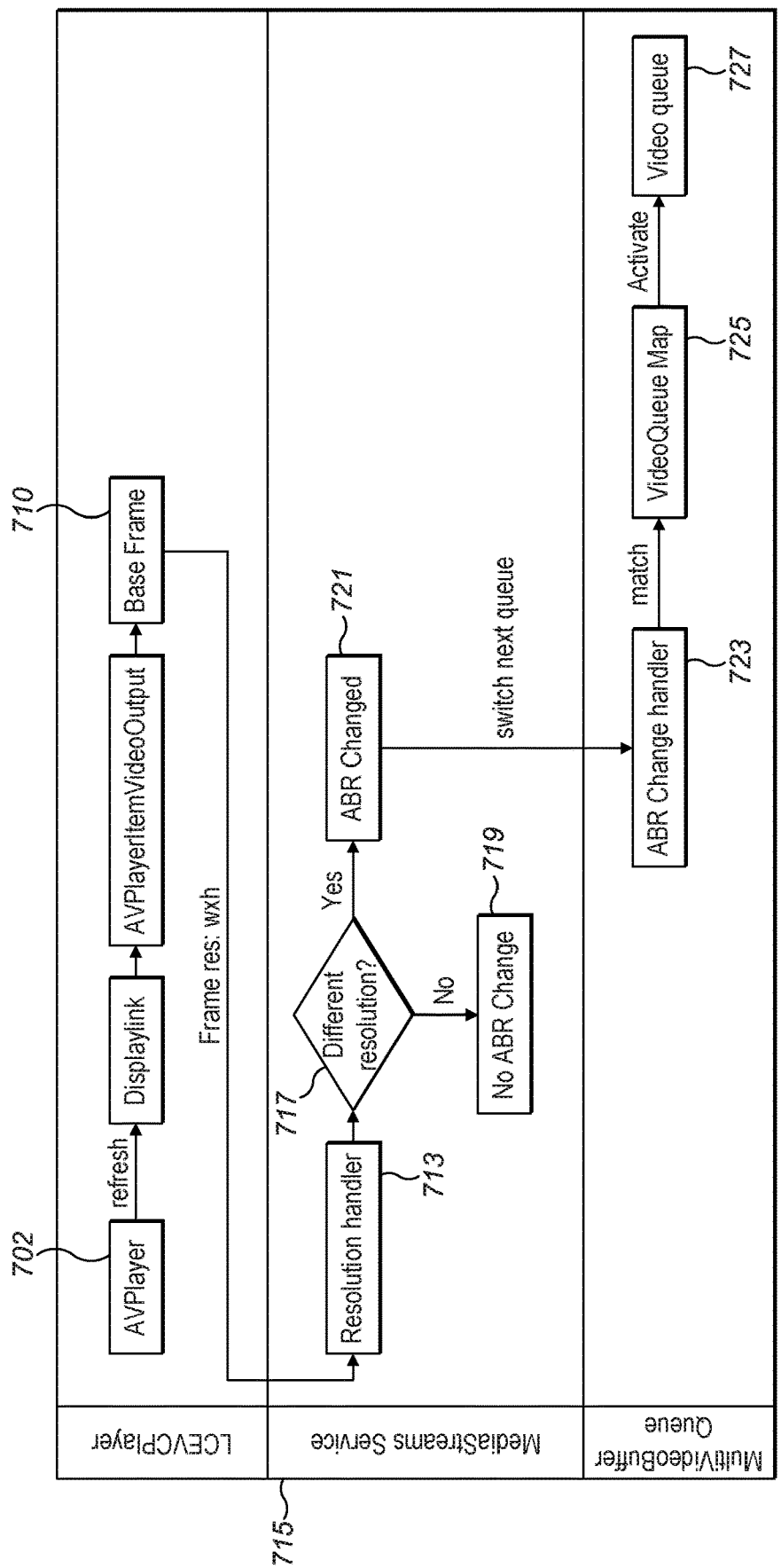
FIG. 7 is a flow diagram depicting another example of a method in accordance with an embodiment of the present invention including detecting an ABR profile change using base frame resolution.

This procedure is illustrated in the example of FIG. 7. An instance of AVPlayer 702 within the LCEVCPlayer layer outputs a decoded base frame 710 via the display link and AVPlayer item video output. The base frame is passed to the media streams service 715, where it is received at a resolution handler 713. A determination is then made at step 717 as to whether the frame resolution of the base frame 710 is different from a preceding base frame. If it is determined that the resolution does not differ, then the service accordingly determines that no ABR profile change has occurred 719. Alternatively, if a difference in frame resolutions is detected 721, the service switches to the next queue. Thereupon the multi video buffer queue layer, including an ABR change handler 723 determines a match for the ABR profile, instructing a video queue map 725 and activating the corresponding video queue 727.

In cases wherein a current stream has video substreams that all differ in their resolutions, the change may be detected simply by tracking resolution changes only. This may be employed, for instance, where the following example manifest and corresponding substreams are provided:

manifest.m3u8
Icevc2.m3u8-1920×1080
Icevc3.m3u8-1280×720
Icevc4.m3u8-960×540

If a stream has video substreams at least two of which share the same resolution, on the other hand, then trackId may additionally be used for detecting the change. An example of such a set of substreams is:

manifest.m3u8
Icevc2.m3u8-1920×1080-5K
Icevc3.m3u8-1920×1080-3K
Icevc4.m3u8-1280×720-1K Since the trackID can change for both profile switches and seek operations, that criterion cannot in itself allow a profile change determination to be made. For this task, it is also important to take into account the abovementioned notification that AVPlayer uses to notify that the profile is going to change. Once such notification is received, it gets stored, and upon the trackID changing the profile is to change also. Typically there is no relationship between base image and trackId. Rather, trackId information is provided as part of the AVPlayerItem structure. However, generally, in every frame update, trackid is sent to trackId change handler.

A profile change detection by way of a trackID identifier associated with the video stream is shown in FIG. 8. As with the previous example, in this process the output of a base frame 810 from the AVPlayer instance 802 is performed in a similar manner. An assessment is then made by a trackID change handler in the media streams service layer 815. The trackID change handler 829 makes an assessment based on the video as set trackID associated with the received base frame 810 as to whether the trackID has changed from that associated with a preceding frame 831. If it is determined that no such change has occurred 832 then it is likewise determined that there is no change to the ABR profile.

A similar determination is made based on the register access log entry notifications 833, by way of the media streams service 815 further monitoring log entries therein and assessing any new entry 835 as to whether it signals an impending bitrate change 837. If it is determined at step 839 from the ABR change events array that there is no event, then the aforementioned determination that no ABR change has occurred 832 is made.

In the case that it is determined that an ABR change event has occurred, or if it is determined at step 831 that the trackID has changed, then a change to the ABR profile is determined 841. Thereupon a switch to the next queue is performed, and the ABR change handler 823 similarly initiates the matching of an appropriate video queue 827 and its activation.

Once the determination has been made as to when the profile is to change, the next profile, to which the change is to be made, is to be selected. In making this selection there are envisaged two separate scenarios to which the present example may be applied. The first scenario involves playlists that contain only profiles with different resolutions, and the second involves playlists that contain some profiles that share the same resolution.

The first scenario, in which all profiles have different resolutions, is illustrated by the flow in FIG. 9. As soon as the manifest passes through our WebProxyServer, the MediaStreamService parses it and ascertains how many different profiles are contained in the playlist. Using the obtained information, when a base frame with a different resolution is received, detecting the next active LVBQ can be performed by comparing the resolution, and identifying the one that matches with the resolution of the new base.

In the example depicted, a decoded base frame 910 corresponding to the resolutions shown is output from the AVPlayer instance 902. The resolution handler 913 analyses the said frame resolution and determines a resolution difference, and accordingly that the ABR profile has changed 940. From the set of available ABR profile parameters 941 obtained from the media streams 943 from the manifest file 945 in the media streams service 915, it can be determined that all available corresponding ABR profiles relate to different resolutions 947. On that basis, a match with the appropriate media stream 949 having the correct resolution may be found, and a switch is made to that media stream.

The second scenario, in which some profiles have the same resolution, is shown in FIG. 10. Upon the resolution of the base changing, a first check is performed, as to whether there are multiple matching resolutions in the manifest. If multiple matches are not found, then choosing the next active LVBQ can be performed similarly to the previous scenario. However, in the case of multiple matching resolutions, some other factors have to be taken into account in order to find the next active queue.

The possibility is envisaged that more than one notification saying that the profile is going to change is detected, despite the resolution of the base not having changed by the time the second notification is detected. In this case, a check is performed as to which LVBQ contains the time range that includes the switch. That one is accordingly selected as the next active queue. In the event of more than one match, the profile with the highest bitrate is selected. In the illustrated example, a check is performed as to which LVBQ contains the time range that includes the switch. LVBQ is agnostic as to any downloaded content, and is related to the MediaStreamService. In particular, a segments download listener is provided in the present example, which is configured to store downloaded segment information to be used in the functionality for finding the next queue. The queue-identifying logic for deciding ABR changes as well as the next profile are provided within the MediaStreamsService.

As shown in FIG. 10, a base frame 1010 with the corresponding resolution, time, and trackID information as shown from an AVPlayer instance 1002 is analysed by the ABR decision handler 1051. As described in connection with the previous example, the determination is made as to whether the resolutions of available ABR profiles are all different 1047. If a positive determination is made, and there is no degeneracy in the available resolutions, then the resolution determined with the detected ABR change 1040 can be used to match the appropriate media stream 1053 as previously described.

However, a negative determination, namely that at least two of the available ABR profiles correspond to the same resolution, then requires a further selection to be made. Firstly, the available profiles are filtered according to their resolution 1055 advantageously, if a singular result is produced 1057, then the appropriate media stream and ABR profile 1053 can be unambiguously identified. Otherwise, in the event of the said filtering 1055 leading to multiple results, a further selection is made based upon whether there are multiple match events to the information in the ABR change events array 1059, at step 1061. In this way, the multiple result of filtering by the resolution can be cross-referenced with information in the event log described previously, and if a single matching event is produced at step 1061, then the appropriate ABR profile parameter can be identified 1053.

Alternatively, if this further check does not yield a single result, the plurality of matching segments can be filtered further, based upon their time ranges, at step 1063. The information upon which this determination is based may be obtained from the media streams service 1015, whereby the manifest file 1052 provides the media streams 1054, from which the available resolutions 1056, on the basis of which the filtering at step 1055 is performed, can be obtained. The video segments 1058 can then be used at the time range-based filtering at step 1063. Timing information can be used to find the correct subsequent segment to be played by the player. For instance, if the time is 27.7 seconds, then, if segments are regular and each have a length of ten seconds, in this step segments can be sought in the range 20.0-30.0.

Thus in the case of resolution degeneracy, multiple resolution matches, multiple match events creating ambiguity at this stage, the appropriate ABR profile may be found 1053 on the basis of matching the time range. In the event that multiple matching segments are identified 1065, the segment corresponding to the highest bitrate is selected 1067, and determines to correspond to the appropriate ABR profile to which a switch is made at 1053 as previously described.

Figure 13:
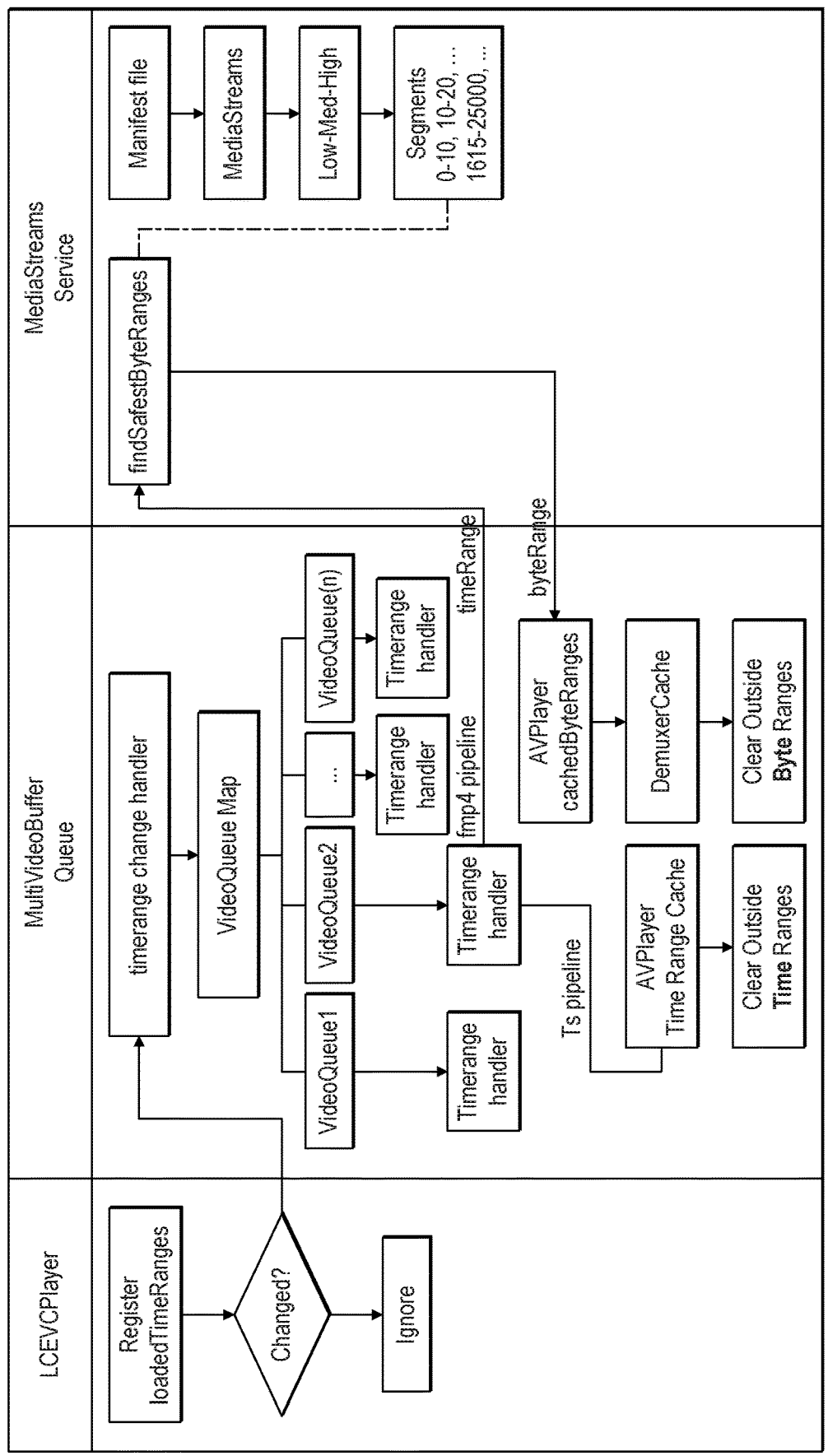
FIG. 13 shows a flow chart illustrating an example method in accordance with an embodiment of the present invention including cache cleaning.

FIG. 13 shows an example illustrating cache cleaning. In this case, data is received only through requests by the AVPlayer instance. Therefore an approach for mimicking the internal AVPlayer cache is necessary. In order to understand when the cache needs to be pruned, AVPlayer's notification loadedTimeRange is used, from which it can be determined when the time ranges loaded inside AVPlayer change.

The said notification is then processed to find the safest ranges to drop, both for fMP4 (findSafestBytaRanges) and for TS (findSafestTimeRanges). The safest range is produced, typically adding some margins to the start and end of the range. Once this is complete, all the data outside the safest ranges is dropped.

This is safe to do because, since AVPlayer keeps only certain ranges in memory, it can be ensured that if the portion of stream that is being dropped needs to be played in the future, after a seek operation for instance, AVPlayer will request that data again, since it does not have it stored. This means that the said data will go through the WebProxy-Server and then through the Demuxer (either TS or MP4) again.

The invention claimed is:

1. A method comprising:
receiving an encoded video stream at a server application, the encoded video stream being encoded according to a multi-layer coding scheme, the encoded video stream including an encoded base stream and an encoded enhancement stream;
passing, to a base decoder, the encoded base stream that is included in the encoded video stream, the base decoder operating on the encoded base stream to obtain a decoded base stream;
passing, to an enhancement decoder, the encoded enhancement stream that is included in the video stream, the enhancement decoder operating on the encoded enhancement stream to obtain a decoded enhancement stream, wherein an original input video is reconstructable from the decoded base stream and the decoded enhancement stream;
identifying a difference in frame resolution between a first frame in the encoded video stream and a second frame in the encoded video stream, the second frame being a subsequent frame relative to the first frame, wherein the identified difference in the frame resolution indicates a change in a bitrate of the encoded video stream;
determining a time at which the change in the bitrate of the encoded video stream occurs;
instructing the base decoder to obtain the decoded base stream in accordance with a predetermined bitrate parameter corresponding to the encoded base stream; and
detecting a change to the predetermined bitrate parameter, the detected change corresponding to the change in the bitrate of the encoded video stream.

2. The method of claim 1, wherein the base decoder is a native decoder of an iOS operating system.

3. The method of claim 1, wherein a decoder integration layer controls operation of the enhancement decoder.

4. The method of claim 1, further comprising:
receiving, by the server application, a request for a data asset sent by the base decoder;
sending the request to a data asset source; and
receiving, by the server application and in response to the request, a data asset comprising the encoded video stream.

5. The method of claim 4, further comprising:
prior to the sending of the request by the server application, modifying the request so as to indicate the server application as a recipient of a response to the request.

6. The method of claim 1, wherein detecting the change to the predetermined bitrate parameter comprises detecting a bitrate parameter change notification.

7. The method of claim 6, wherein the bitrate parameter change notification comprises notification data recorded in a log, and the detection of the bitrate parameter change notification comprises monitoring or analyzing data recorded in the log.

8. The method of claim 1, comprising obtaining an indication of the time when the change in the bitrate occurs.

9. The method of claim 8, wherein obtaining the indication comprises detecting a change in an identifier associated with the encoded video stream.

10. The method of claim 1, further comprising identifying the changed predetermined bitrate parameter.

11. The method of claim 10, wherein the changed predetermined bitrate parameter is included in a plurality of bitrate parameters, and wherein identifying the changed predetermined bitrate parameter is performed in accordance with a determination of whether any one bitrate parameter set included in the plurality of bitrate parameters corresponds to a frame resolution that is the same as a frame resolution corresponding to another bitrate parameter set included in the plurality of bitrate parameters.

12. An apparatus configured to:
   receive an encoded video stream at a server application, the encoded video stream being encoded according to a multi-layer coding scheme, the encoded video stream including an encoded base stream and an encoded enhancement stream;
   pass, to a base decoder, the encoded base stream that is included in the encoded video stream, the base decoder operating on the encoded base stream to obtain a decoded base stream;
   pass, to an enhancement decoder, the encoded enhancement stream that is included in the video stream, the enhancement decoder operating on the encoded enhancement stream to obtain a decoded enhancement stream, wherein an original input video is reconstructable from the decoded base stream and the decoded enhancement stream;
   identify a difference in frame resolution between a first frame in the encoded video stream and a second frame in the encoded video stream, the second frame being a subsequent frame relative to the first frame, wherein the identified difference in the frame resolution indicates a change in a bitrate of the encoded video stream;
   determine a time at which the change in the bitrate of the encoded video stream occurs;
   instruct the base decoder to obtain the decoded base stream in accordance with a predetermined bitrate parameter corresponding to the encoded base stream; and
   detect a change to the predetermined bitrate parameter, the detected change corresponding to the change in the bitrate of the encoded video stream.

13. A computer system comprising:
   one or more processors; and
   one or more hardware storage devices that store instructions that are executable by the one or more processors to cause the computer system to:
      receive an encoded video stream that is encoded according to a multi-layer coding scheme and that includes an encoded base stream and an encoded enhancement stream;
      pass, to a base decoder, the encoded base stream, which is tasked with operating on the encoded base stream to obtain a decoded base stream;
      pass, to an enhancement decoder, the encoded enhancement stream, which is tasked with operating on the encoded enhancement stream to obtain a decoded enhancement stream;
      identify a difference in frame resolution between a first frame in the encoded video stream and a second frame in the encoded video stream, the second frame being a subsequent frame relative to the first frame, wherein the identified difference in the frame resolution indicates a change in a bitrate of the encoded video stream;
      determine a time when the change in the bitrate of the encoded video stream occurs;
      instruct the base decoder to obtain the decoded base stream in accordance with a predetermined bitrate parameter corresponding to the encoded base stream; and
      detect a change to the predetermined bitrate parameter, the detected change corresponding to the change in the bitrate of the encoded video stream.

14. The computer system of claim 13, wherein the encoded video stream further includes a second encoded enhancement stream.

15. The computer system of claim 13, wherein the encoded base stream that is passed to the base decoder is a demultiplexed encoded base stream.

16. The computer system of claim 13, wherein the encoded enhancement stream that is passed to the enhancement decoder is a demultiplexed encoded enhancement stream.

17. The computer system of claim 13, wherein the computer system hosts the base decoder.

18. The computer system of claim 13, wherein the base decoder is a native decoder of an operating system of the computer system.

19. The computer system of claim 13, wherein the base decoder is configured to support adaptive bitrate video streaming.

20. The computer system of claim 13, wherein the enhancement decoder is instructed to decode the encoded enhancement stream based on a bitrate profile.

* * * * *